(12) United States Patent
Kobayashi

(10) Patent No.: US 10,474,426 B2
(45) Date of Patent: Nov. 12, 2019

(54) INFORMATION PROCESSING DEVICE, INFORMATION PROCESSING METHOD, AND COMPUTER PROGRAM

(71) Applicant: SONY CORPORATION, Tokyo (JP)

(72) Inventor: Kenichiro Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 29 days.

(21) Appl. No.: 15/113,492

(22) PCT Filed: Mar. 23, 2015

(86) PCT No.: PCT/JP2015/058679
§ 371 (c)(1),
(2) Date: Jul. 22, 2016

(87) PCT Pub. No.: WO2015/163068
PCT Pub. Date: Oct. 29, 2015

(65) Prior Publication Data
US 2017/0003933 A1 Jan. 5, 2017

(30) Foreign Application Priority Data

Apr. 22, 2014 (JP) .................................. 2014-087883

(51) Int. Cl.
| | |
|---|---|
| G06F 3/16 | (2006.01) |
| G06K 9/00 | (2006.01) |
| G06K 9/32 | (2006.01) |
| G06T 11/60 | (2006.01) |
| G06K 9/20 | (2006.01) |
| G06F 3/01 | (2006.01) |
| G10L 15/22 | (2006.01) |

(52) U.S. Cl.
CPC .............. *G06F 3/167* (2013.01); *G06F 3/011* (2013.01); *G06F 3/16* (2013.01); *G06K 9/00671* (2013.01); *G06K 9/2081* (2013.01); *G06K 9/3233* (2013.01); *G06T 11/60* (2013.01); *G06T 2207/10004* (2013.01); *G06T 2207/20021* (2013.01); *G06T 2207/20104* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,749,000 | A * | 5/1998 | Narisawa | G02B 7/28 396/121 |
| 5,818,423 | A * | 10/1998 | Pugliese | G06F 3/04812 345/157 |
| 8,484,017 | B1 * | 7/2013 | Sharifi | G10L 15/265 704/205 |

(Continued)

*Primary Examiner* — Jonathan C Kim
(74) *Attorney, Agent, or Firm* — Paratus Law Group, PLLC

(57) ABSTRACT

There is provided an information processing device capable of deciding process content of image information according to content of language information input by users, the information processing device including: an image region specifying unit configured to specify a region in an image based on input language information, and a process content specifying unit configured to specify content of a process using the image in regard to the region specified in the image by the image region specifying unit based on the input language information.

19 Claims, 17 Drawing Sheets

(56) References Cited

U.S. PATENT DOCUMENTS

| | | | |
|---|---|---|---|
| 8,776,141 B2* | 7/2014 | Lee | G06F 16/9032 725/60 |
| 9,143,603 B2* | 9/2015 | Davis | H04M 1/72569 |
| 9,245,288 B1* | 1/2016 | Lee | H04L 29/06476 |
| 9,286,910 B1* | 3/2016 | Li | G10L 25/48 |
| 9,372,545 B2* | 6/2016 | Song | G06F 3/0304 |
| 9,778,825 B2* | 10/2017 | Cho | G06F 16/583 |
| 2003/0112267 A1* | 6/2003 | Belrose | G06F 3/038 715/728 |
| 2003/0128211 A1* | 7/2003 | Watanabe | G06T 11/60 345/428 |
| 2003/0191627 A1* | 10/2003 | Au | G06F 17/2785 704/9 |
| 2005/0189419 A1* | 9/2005 | Igarashi | H04N 5/23212 235/454 |
| 2005/0195309 A1* | 9/2005 | Kim | G03B 13/36 348/345 |
| 2006/0036441 A1* | 2/2006 | Hirota | G06F 16/58 704/270.1 |
| 2008/0120141 A1* | 5/2008 | Kariathungal | G06F 3/013 705/3 |
| 2008/0288260 A1* | 11/2008 | Cho | G06F 3/011 704/275 |
| 2009/0059027 A1* | 3/2009 | Iwamoto | H04N 5/232 348/222.1 |
| 2009/0083029 A1* | 3/2009 | Doi | G10L 15/26 704/200 |
| 2009/0177477 A1* | 7/2009 | Nenov | A61B 5/0002 704/275 |
| 2011/0267531 A1* | 11/2011 | Imai | H04N 5/23212 348/333.12 |
| 2013/0002928 A1* | 1/2013 | Imai | H04N 5/23216 348/333.11 |
| 2013/0030811 A1* | 1/2013 | Olleon | B60K 37/06 704/267 |
| 2013/0031479 A1* | 1/2013 | Flowers | G06F 8/00 715/716 |
| 2013/0202207 A1* | 8/2013 | Ryu | G06Q 30/02 382/182 |
| 2014/0074466 A1* | 3/2014 | Sharifi | G10L 15/08 704/235 |
| 2014/0152696 A1* | 6/2014 | Jung | G06F 3/011 345/633 |
| 2014/0168478 A1* | 6/2014 | Baheti | G06K 9/2081 348/240.99 |
| 2014/0244165 A1* | 8/2014 | Bells | G01C 21/367 701/455 |
| 2014/0289323 A1* | 9/2014 | Kutaragi | G06Q 50/01 709/203 |
| 2015/0019227 A1* | 1/2015 | Anandarajah | G10L 15/22 704/257 |
| 2015/0042543 A1* | 2/2015 | Kim | G02B 27/017 345/8 |
| 2015/0084883 A1* | 3/2015 | Kim | G06F 3/0488 345/173 |
| 2015/0187371 A1* | 7/2015 | Parkinson | G10L 17/22 381/110 |
| 2015/0189362 A1* | 7/2015 | Lee | G10L 15/22 725/38 |
| 2015/0237300 A1* | 8/2015 | Mendis | H04L 65/1059 348/14.11 |
| 2016/0005171 A1* | 1/2016 | Watanabe | G06K 9/00677 382/118 |
| 2016/0275906 A1* | 9/2016 | Scott | G09G 5/006 |
| 2016/0335051 A1* | 11/2016 | Osawa | G10L 15/22 |
| 2017/0017833 A1* | 1/2017 | Watanabe | H04N 5/915 |

* cited by examiner

| A | B | C |
|---|---|---|
| D | E | F |
| G | H | I |

A: TOP LEFT, UPPER LEFT, ...
B: TOP MIDDLE, TOP CENTER, UPPER TOP, ...
C: TOP RIGHT, UPPER RIGHT, ...
D: LEFT, LEFT MIDDLE, ...
E: MIDDLE, CENTER, CENTRAL, ...
F: RIGHT, RIGHT CENTER, ...
G: BOTTOM LEFT, LOWER LEFT, ...
H: BOTTOM MIDDLE, BOTTOM CENTER, ...
I: BOTTOM RIGHT, LOWER RIGHT, ...

FIG. 5 i103

HIGH LEVEL: VERY, QUITE, TREMENDOUSLY, EXTREMELY, ...
INTERMEDIATE LEVEL: (NO DEGREE EXPRESSION), EXACTLY, MOSTLY, JUST, ...
LOW LEVEL: A BIT, JUST A LITTLE, SOMEWHAT ...

FIG. 6 i107

HIGH LEVEL: MORE, FURTHERMORE, MORE THAN THAT ...
LOW LEVEL: A BIT MORE, A LITTLE BIT MORE, JUST A LITTLE BIT MORE ...

FIG. 7

| DEGREE LEVELS | DIVIDED REGIONS | | | | | | | | |
|---|---|---|---|---|---|---|---|---|---|
| | A | B | C | D | E | F | G | H | I |
| HIGH | A,B,D | A,B,C | B,C,F | A,D,G | E | C,F,I | D,G,H | G,H,I | F,H,I |
| INTERMEDIATE | C,E,G | D,E,F | A,E,I | B,E,H | ALL | B,E,H | A,E,I | D,E,F | C,E,G |
| LOW | F,H,I | G,H,I | D,G,H | C,F,I | ALL | A,D,G | B,C,F | A,B,C | A,B,D |

FIG. 8

| A | B | C |
|---|---|---|
| D | E | F |
| G | H | I |

| I-A | I-B | I-C |
|-----|-----|-----|
| I-D | I-E | I-F |
| I-G | I-H | I-I | i104

RECOGNITION RESPONSE
<target-1>.
<size-1><target-1>.
<count-2><color-2><target-2> ARE IN <position-1> OF <target-1>.
......

RETRIEVAL RESPONSE
<target-1> IS HERE.
<target-1> IS FOUND.
......

DIRECTION INSTRUCTION
<target-1> IS IN <direction-1>.
A LITTLE MORE <direction-1>.
......

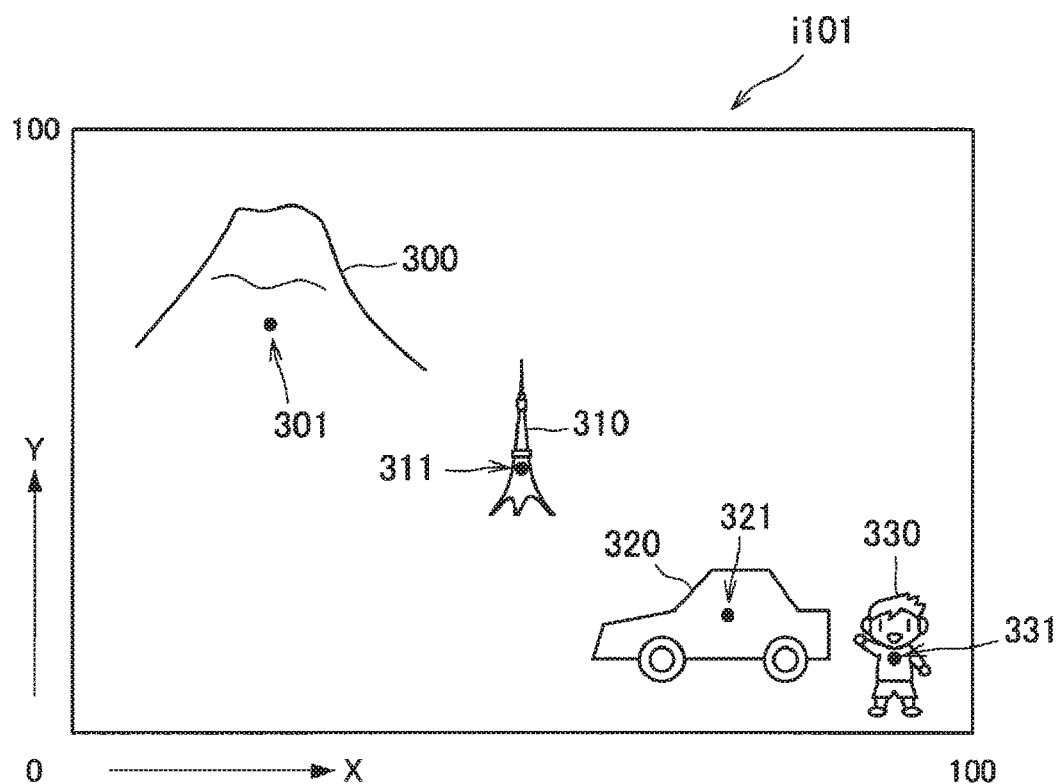

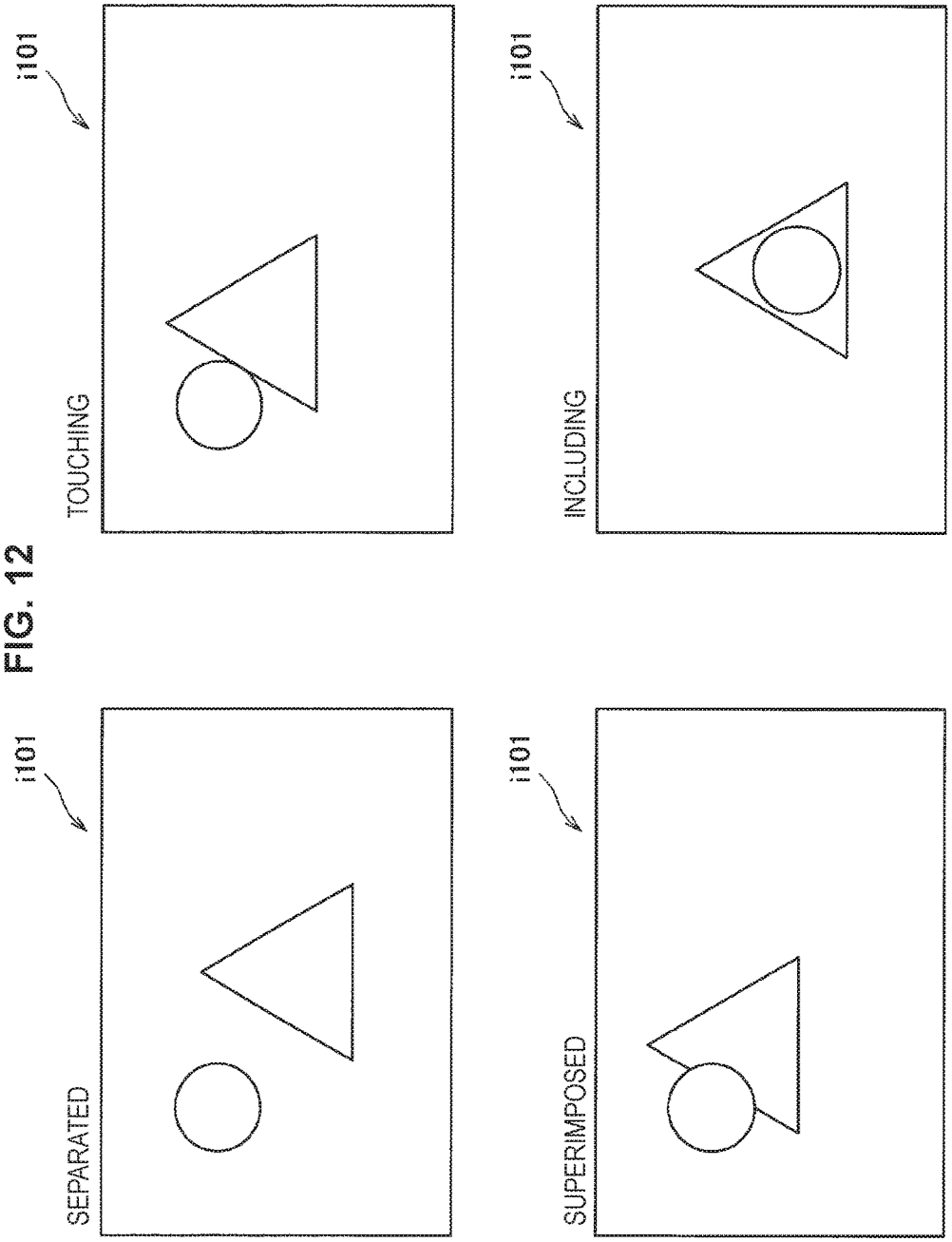

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2015/058679 (filed on Mar. 23, 2015) under 35 U.S.C. § 371, which claims priority to Japanese Patent Application No. 2014-087883 (filed on Apr. 22, 2014), which are all hereby incorporated by reference in their entirety.

TECHNICAL FIELD

The present disclosure relates to an information processing device, an information processing method, and a computer program.

BACKGROUND ART

Technologies for recognizing objects based on image information have been widely used (for example, see Patent Literature 1 and the like). For example, technologies for recognizing faces or predetermined objects from image information have been widely used for digital cameras, smartphones, image processing software operating on personal computers, robot devices, and the like.

CITATION LIST

Patent Literature

Patent Literature 1: JP 2013-175956A

SUMMARY OF INVENTION

Technical Problem

Image information recognition results can be comprehended as positional relations on two X-Y axes on a screen or three axes in consideration of depth. When image recognition targets are specific targets such as faces or objects, position information regarding where the specific targets are located in images can be acquired. Here, when process contents of image information can be decided according to content of language information input by users, processes on the image information can be considered to be performed more effectively.

Accordingly, it is desirable to provide a novel and improved information processing device, a novel and improved information processing method, and a novel and improved computer program capable of deciding process content of image information according to content of language information input by users.

Solution to Problem

According to the present disclosure, there is provided an information processing device including: an image region specifying unit configured to specify a region in an image based on input language information; and a process content specifying unit configured to specify content of a process using the image in regard to the region specified in the image by the image region specifying unit based on the input language information.

In addition, according to the present disclosure, there is provided an information processing method including: specifying a region in an image based on input language information; and specifying content of a process using the image in regard to the specified region in the image based on the input language information.

In addition, according to the present disclosure, there is provided a computer program causing a computer to perform: specifying a region in an image based on input language information; and specifying content of a process using the image in regard to the specified region in the image based on the input language information.

Advantageous Effects of Invention

According to the present disclosure described above, it is possible to provide a novel and improved information processing device, a novel and improved information processing method, and a novel and improved computer program capable of deciding process content of image information according to content of language information input by users.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 3 is an explanatory diagram illustrating a division example of an image region of image information i101 by an image position language information conversion unit 120.

FIG. 4 is a diagram illustrating correspondence examples of region names and names as language stored in a language position information correspondence table i102.

FIG. 5 is a diagram illustrating a correspondence example of levels and adverbs stored in a degree adverb level table i103.

FIG. 6 is an explanatory diagram illustrating an example of information stored in a recursive expression table i107.

FIG. 7 is an explanatory diagram illustrating combinations of divided regions and the levels of degree adverbs when each region is subdivided.

FIG. 8 is an explanatory diagram illustrating a subdivision example of an image region of image information i101.

FIG. 11 is an explanatory diagram illustrating an example of the image information i101 input from an image input unit 11 to the information processing device 100.

FIG. 12 is an explanatory diagram illustrating expressions of superimposition states of recognition objects.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be made in the following order.
<1. Embodiment of the present disclosure>
[1.1. Overview]
[1.2. Example of system configuration]
[1.3. Examples of functional configuration]
[1.4. Examples of operations]
<2. Hardware configuration>
<3. Conclusion>

1. Embodiment of the Present Disclosure 1.1. Overview

First, an overview of preferred embodiments of the present disclosure to be described in detail will be described. As described above, technologies for recognizing objects based on image information have been widely used. For example, technologies for recognizing faces or predetermined objects from image information have been widely used for digital cameras, smartphones, image processing software operating on personal computers, robot devices, and the like.

Image information recognition results can be comprehended as positional relations on two X-Y axes on a screen or three axes in consideration of depth. When image recognition targets are specific targets such as faces or objects, position information regarding where the specific targets are located in images can be acquired. Here, when process contents of image information can be decided according to content of language information input by users, processes on the image information can be considered to be performed more effectively.

Accordingly, the present disclosers have examined technologies for deciding process content of image information according to content of language information input by users. As will be described below, the present disclosers have devised a technology for enabling an effective process on image information by performing a process of deciding process content of image information according to content of language information input by users.

1.2. Example of System Configuration

Figure 1:
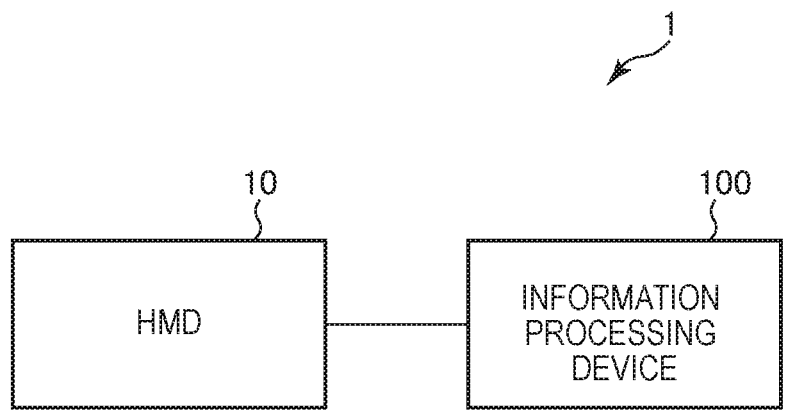
FIG. 1 is an explanatory diagram illustrating an example of the configuration of an information processing system 1 according to an embodiment of the present disclosure.

An example of the configuration of an information processing system according to an embodiment of the present disclosure will be described with reference to the drawings. FIG. 1 is an explanatory diagram illustrating an example of the configuration of an information processing system 1 according to an embodiment of the present disclosure. The information processing system 1 illustrated in FIG. 1 is a system that enables process content to be decided according to content of language information input by a user. Hereinafter, an example of the configuration of the information processing system 1 according to the embodiment of the present disclosure will be described with reference to FIG. 1.

As illustrated in FIG. 1, the information processing system 1 according to the embodiment of the present disclosure is configured to include a head-mounted display (HMD) 10 and an information processing device 100 that acquires information from the head-mounted display 10 and outputs information to the head-mounted display 10. The head-mounted display 10 is a device designed for the purpose of being mounted on the head of a user. The head-mounted display 10 is mounted on the head of the user and is configured to present information in front of the eyes of the user. The head-mounted display 10 includes a camera that images the front or the surroundings of the user and a microphone that collects a sound uttered by the user.

The information processing device 100 performs a process on information acquired from the head-mounted display 10 and outputs information obtained as the result of the process to the head-mounted display 10. In the embodiment, the information processing device 100 performs a process on an image captured by the camera included in the head-mounted display 10 and transmitted from the head-mounted display 10. The process performed by the information processing device 100 is, for example, an image recognition process on an image captured by the camera. The information processing device 100 performs the image recognition process on the image captured by the camera and outputs a result of the image recognition process to the head-mounted display 10.

When the information processing device 100 performs the process on the image captured by the camera included in the head-mounted display 10, the information processing device 100 decides process content based on language information input with the head-mounted display 10, for example, words of the user collected by the microphone included in the head-mounted display 10.

The information processing device 100 according to the embodiment of the present disclosure can decide the process content of the image captured by the camera included in the head-mounted display 10 according to content of the language information input by the user on whom the head-mounted display 10 is mounted.

The example of the configuration of the information processing system 1 according to the embodiment of the present disclosure has been described with reference to FIG. 1. Next, an example of a functional configuration of the information processing system 1 according to an embodiment of the present disclosure will be described.

1.3. Example of Functional Configuration

Figure 2:
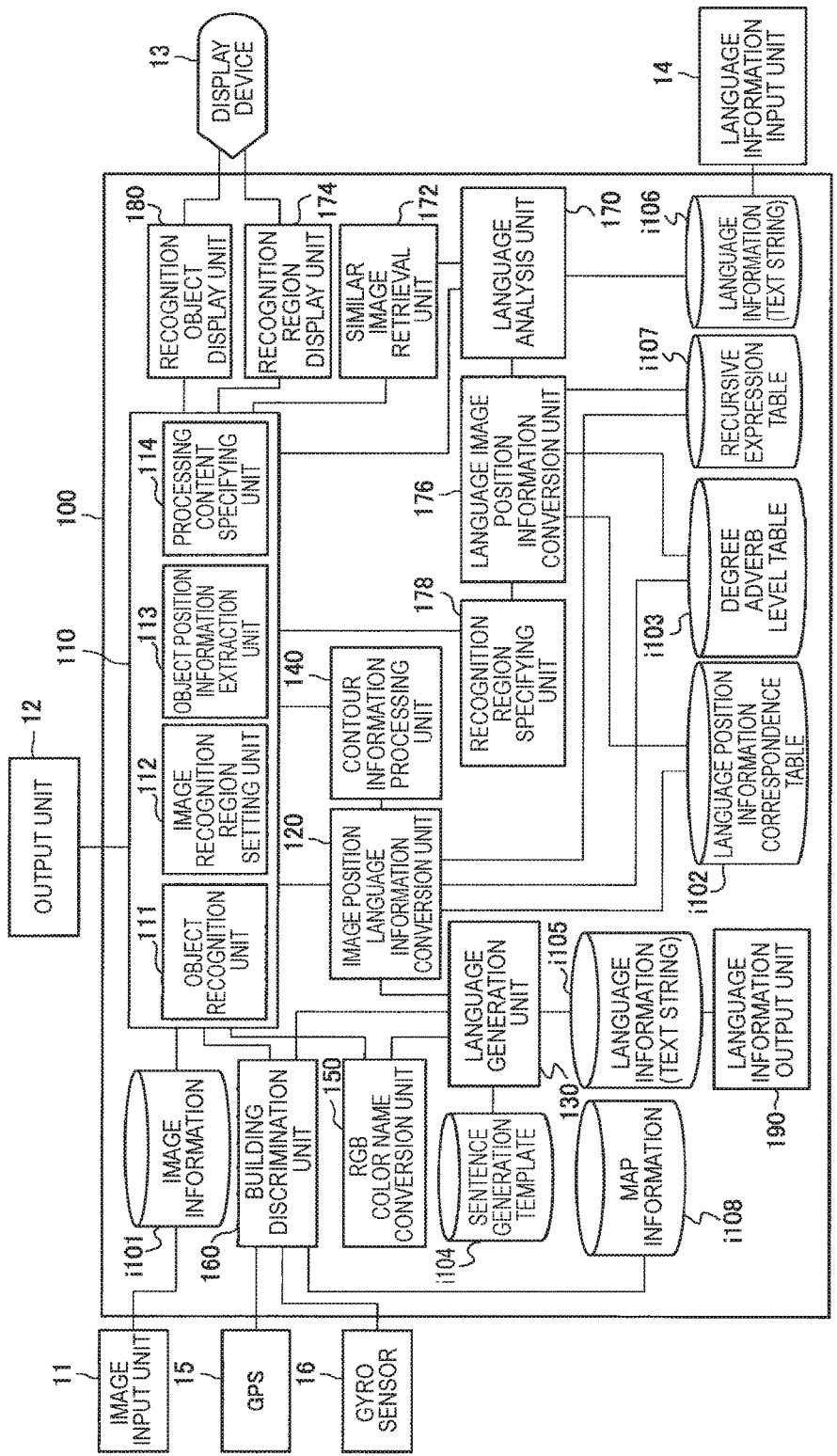
FIG. 2 is an explanatory diagram illustrating an example of a functional configuration of the information processing system 1 according to the embodiment of the present disclosure.

FIG. 2 is an explanatory diagram illustrating the example of the functional configuration of the information processing system 1 according to the embodiment of the present disclosure. FIG. 2 mainly illustrates an example of a functional configuration of the information processing device 100 according to the embodiment of the present disclosure. FIG. 2 also illustrates the configuration of the head-mounted display 10 along with the configuration of the information processing device 100. Hereinafter, the example of the functional configuration of the information processing system 1 according to the embodiment of the present disclosure will be described with reference to FIG. 2.

The information processing device 100 illustrated in FIG. 2 is a device designed for the purpose of performing image processing on the image information i101 transmitted from an image input unit 11 and recognizing an object included in the image information i101. The information processing device 100 illustrated in FIG. 2 is a device designed for the purpose of performing a process on the image information i101 transmitted from the image input unit 11 based on the language information input from a language information input unit 14.

As illustrated in FIG. 2, the information processing device 100 according to the embodiment of the present disclosure is configured to include an image processing unit 110, an image position language information conversion unit 120, a language generation unit 130, a contour information processing unit 140, an RGB color name conversion unit 150, a building discrimination unit 160, a language analysis unit 170, a similar image retrieval unit 172, a recognition region display unit 174, a language image position information conversion unit 176, a recognition region specifying unit 178, a recognition object display unit 180, and a language information output unit 190.

As illustrated in FIG. 2, the head-mounted display 10 according to the embodiment of the present disclosure is configured to include the image input unit 11, an output unit 12, a display device 13, a language information input unit 14, a GPS terminal 15, and a gyro sensor 16.

The image processing unit 110 performs image processing on the image information i101 supplied by the image input unit 11 and recognizes an object included in the image information i101. As illustrated in FIG. 2, the image processing unit 110 is configured to include an object recognition unit 111, an image recognition region setting unit 112, an object position information extraction unit 113, and a process content specifying unit 114.

The object recognition unit 111 recognizes a predetermined object included in the image information i101. The object to be recognized by the object recognition unit 111 is not limited to a specific object, but any of various objects can be a recognition target. The object recognition unit 111 recognizes the object included in the image information i101 to recognize which objects are present and how many objects are present in the image information i101. The object recognition unit 111 transmits information regarding a recognition object obtained as a result of the recognition process on the image information i101, for example, information such as the names of recognized objects or the number of recognized objects, to the image position language information conversion unit 120.

The image recognition region setting unit 112 sets a range in which the object recognition unit 111 recognizes an object in the image information i101. The object recognition unit 111 recognizes a predetermined object included in the image information i101 in the range of the image information i101 set by the image recognition region setting unit 112. When the object recognition unit 111 first recognizes the object in the image information i101, the image recognition region setting unit 112 sets a region so that the process can be performed in the whole range of the image information i101. For example, when the user or the like makes a request for recognition of a limited range of the image information i101 or makes a request for re-recognition near a detected object through the language information input unit 14, the image recognition region setting unit 112 may set the region so that the process can be performed only near the object. For example, when the recognition region specifying unit 178 specifies a recognition region in the image information i101, the image recognition region setting unit 112 sets a range in which the object recognition unit 111 recognizes an object in the image information i101 based on the recognition region specified by the recognition region specifying unit 178.

The object position information extraction unit 113 extracts the position of the predetermined object included in the image information i101 and recognized by the object recognition unit 111 in the image information i101 as position information. The object position information extraction unit 113 may extract a centroid position of the predetermined object included in the image information i101 as position information. When the object position information extraction unit 113 extracts the centroid position of the predetermined object included in the image information i101 as position information, the object position information extraction unit 113 may obtain the centroid position by integration. The object position information extraction unit 113 transmits the position information of the predetermined object included in the image information i101 to the image position language information conversion unit 120.

The process content specifying unit 114 specifies process content processed by the image processing unit 110 based on content of language information i106 transmitted via the language information input unit 14. As will be described in detail below, for example, when content for inquiring about the name of an object is included in the language information i106, the process content specifying unit 114 specifies that a process is performed to acquire the name of the object included in the image information i101, as the process content processed by the image processing unit 110. For example, when content for instructing to retrieve an object is included in the language information i106, the process content specifying unit 114 specifies that a process is performed to retrieve the object included in the image information i101, as the process content processed by the image processing unit 110.

The image position language information conversion unit 120 performs a process of converting information transmitted from the image processing unit 110, specifically, information regarding the recognition object transmitted from the object recognition unit 111 and the position information extracted by the object position information extraction unit 113, into language information. The image position language information conversion unit 120 generates information regarding which object is present and where the object is present in the image information i101 as language information. A specific conversion process performed by the image position language information conversion unit 120 will be described in detail below. Upon conversion, the image position language information conversion unit 120 uses a language position information correspondence table i102, a degree adverb level table i103, and a recursive expression table i107. FIG. 3 is an explanatory diagram illustrating a division example of an image region of the image information i101 by the image position language information conversion unit 120. FIG. 4 is a diagram illustrating correspondence examples of region names and names as language stored in a language position information correspondence table i102. FIG. 5 is a diagram illustrating a correspondence example of levels and adverbs stored in the degree adverb level table i103. FIG. 6 is an explanatory diagram illustrating an example of information stored in the recursive expression table i107. When the image position language information conversion unit 120 converts the information transmitted from the image processing unit 110 into the language information, the image position language information conversion unit 120 transmits the language information to the language generation unit 130.

FIG. 3 is an explanatory diagram illustrating a division example of an image region of the image information i101 by the image position language information conversion unit 120. In the example illustrated in FIG. 3, the image position language information conversion unit 120 equally divides the region into 3 regions along the X and Y axes based on a maximum value of the X-Y coordinates of a whole image, and then gives region names with letters A to I to the regions.

The image position language information conversion unit 120 assigns names of the divided regions as language. Upon assigning the names, the image position language information conversion unit 120 refers to the language position information correspondence table i102. FIG. 4 illustrates a correspondence example of region names and names as language stored in the language position information correspondence table i102. For example, a region A corresponds to a name "upper left" or "top left."

Upon assigning an adverb, the image position language information conversion unit 120 refers to the degree adverb level table i103. FIG. 5 illustrates a correspondence example of levels and adverbs stored in the degree adverb level table i103. In the example illustrated in FIG. 5, adverbs such as "very," "quite," "tremendously," and "extremely" are assigned as adverbs corresponding to the level "High."

The image position language information conversion unit 120 uses the recursive expression table i107 illustrated in FIG. 6 in conversion into language information with a recursive expression such as "more" or "a bit more." In the recursive expression table i107 illustrated in FIG. 6, words such as "more," "furthermore," and "more than that" are assigned as expressions corresponding to the level "High" and phrases such as "a bit more," "a little bit more," and "just a little bit more" are assigned as expressions corresponding to the level "Low."

The language generation unit 130 generates language information i105 indicating the state of the image information i101, that is, a sentence indicating the state of the image information i101 using the language information transmitted from the image position language information conversion unit 120. In the embodiment, upon generating the sentence indicating the state of the image information i101, the language generation unit 130 generates the sentence indicating the state of the image information i101 by applying the language information transmitted from the image position language information conversion unit 120 to a template stored in a sentence generation template i104. A process of generating the sentence indicating the state of the image information i101 by the language generation unit 130 will be described in detail below.

The contour information processing unit 140 acquires coordinate information of the contour of the object recognized by the object recognition unit 111 using information transmitted from the image processing unit 110. When acquiring the coordinate information of the contour of the object, the contour information processing unit 140 can use, for example, a known edge detection process. The contour information processing unit 140 transmits the coordinate information of the contour of the object to the image position language information conversion unit 120. When a plurality of objects are present in the image information i101, the image position language information conversion unit 120 can determine whether the objects are superimposed and generate language information according to the superimposition state by acquiring the coordinate information of the contours of the objects.

The RGB color name conversion unit 150 acquires a color of a recognition object using information transmitted from the image processing unit 110, specifically, information regarding the recognition object transmitted from the object recognition unit 111. The RGB color name conversion unit 150 transmits information regarding the color of the recognition object to the language generation unit 130. The language generation unit 130 can add the information regarding the color of the object recognized by the object recognition unit 111 to the sentence indicating the state of the image information i101 by obtaining the information regarding the recognition object from the RGB color name conversion unit 150.

The building discrimination unit 160 performs a process of discriminating a building captured in the image information i101. Specifically, the building discrimination unit 160 discriminates which building the recognition object recognized by the object recognition unit 111 is using the information transmitted from the image processing unit 110. The building discrimination unit 160 transmits information regarding the building captured in the image information i101 to the language generation unit 130. The language generation unit 130 can add the information regarding the building captured in the image information i101 to the sentence indicating the state of the image information i101 by obtaining the information regarding the building captured in the image information i101 from the building discrimination unit 160. Upon acquiring the information regarding the building shown in the image information i101, the building discrimination unit 160 refers to map information i108. Upon acquiring the information regarding the building captured in the image information i101, the building discrimination unit 160 may refer to information regarding a current position transmitted from the GPS terminal 15 or information regarding a direction of the head-mounted display 10 transmitted from the gyro sensor 16.

The language analysis unit 170 performs an analysis process on the language information (text string) i106 input from the language information input unit 14. The language information i106 input from the language information input unit 14 may be, for example, voice data or text data. When the language information i106 is the voice data, the language analysis unit 170 first converts the voice data into text data and performs the analysis process on the converted text data. When the language information i106 is the text data, the language analysis unit 170 directly performs the analysis process on the text data.

When an inquiry about the image information i101 is understood as the result of the analysis process on the language information i106, the language analysis unit 170 instructs the image processing unit 110 to start an object recognition process on the object included in the image information i101. For example, when the language information i106 is an inquiring sentence, such as "What is that?" the language analysis unit 170 instructs the image processing unit 110 to start the object recognition process on the object included in the image information i101.

When an inquiry about the image information i101 is understood and an inquiry about an object similar to an existing object is understood as the result of the analysis process on the language information i106, the language analysis unit 170 instructs the image processing unit 110 to start the object recognition process on the object included in the image information i101 and instructs the similar image retrieval unit 172 to retrieve the similar image. For example, when the language information i106 is an inquiring sentence, such as "What is that object that looks like a rocket?" the language analysis unit 170 instructs the image processing unit 110 to start the object recognition process on the object included in the image information i101 and instructs the similar image retrieval unit 172 to perform a similar-image retrieval process of retrieving an object similar to a rocket included in the image information i101.

When an inquiry about the image information i101 is understood and an inquiry about specifying a region is understood as the result of the analysis process on the language information i106, the language analysis unit 170 instructs the image processing unit 110 to start the object recognition process on the object included in the image information i101 and instructs the language image position information conversion unit 176 to convert the language information i106 into information regarding a position in the image information i101. For example, when the language information i106 is an inquiring sentence, such as "What is that object located on the bottom right?" the language analysis unit 170 instructs the image processing unit 110 to start the object recognition process on the object included in the image information i101 and instructs the language image position information conversion unit 176 to convert the language information specifying the region "bottom right" into information regarding a position in the image information i101.

The language analysis unit 170 determines how the region is set in an image and which process is performed using the image by performing analysis in units of words through morphological analysis and recognizing parts of speech of words and relations between the words. For example, when the input language information i106 is an inquiring sentence, such as "Where is Mt. Fuji?" the language analysis unit 170 divides the language information i106 into "Mt. Fuji," "Is," "Where," and "?" through the morphological analysis. The language analysis unit 170 determines that location retrieval is performed with a keyword "Where" in the divided language information i106 and determines that the noun "Mt. Fuji" in the divided language information i106 is a target of the location. Accordingly, when the language information i106 is an inquiring sentence such as "Where is Mt. Fuji?" the language analysis unit 170 can determine that the language information i106 is language information for making a request for retrieving the location of Mt. Fuji through the morphological analysis.

The language analysis unit 170 may perform the analysis process for the language information i106 through the above-described morphological analysis using a technology disclosed in, for example, JP 2011-216071 or JP 2012-238062. Of course, it is needless to say that the language analysis unit 170 may perform the analysis process for the language information i106 through the morphological analysis using a technology other than the technologies disclosed in the above literatures.

The similar image retrieval unit 172 performs a similar-image retrieval process. In the embodiment, the similar image retrieval unit 172 performs a process of retrieving an object included in the image information i101 and similar to the object included in the language information i106. In the embodiment, the similar image retrieval unit 172 calculates similarity which is an index indicating how similar the object included in the image information i101 is to the object included in the language information i106. When the similar image retrieval unit 172 calculates the similarity, the similar image retrieval unit 172 delivers a value of the calculated similarity to the image processing unit 110.

The calculation of the similarity is not limited to a specific method. For example, a technology for calculating the similarity of an image is disclosed in JP 2010-3021A. The similar image retrieval unit 172 may calculate the similarity of the image using the technology disclosed in the above literature.

The language image position information conversion unit 176 performs a process of converting the language information i106 into position information on the image information i101 using the result of the analysis process performed on the language information i106 by the language analysis unit 170. When converting the language information i106 into the position information on the image information i101, the language image position information conversion unit 176 uses the language position information correspondence table i102, the degree adverb level table i103, and the recursive expression table i107, as in the image position language information conversion unit 120. The language image position information conversion unit 176 transmits the result obtained by converting the language information i106 into the position information on the image information i101 to the recognition region specifying unit 178.

The language image position information conversion unit 176 divides the image information i101 into, for example, 3 pieces "left, middle, and right" along the X axis and divides the image information i101 into 3 pieces "top, middle, and bottom" along the Y axis. The language image position information conversion unit 176 divides the image information i101 into 3 pieces along both of the X and Y axes, that is, 9 pieces in total, so that the language information i101 corresponds to the language information i106.

The recognition region specifying unit 178 is an example of an image region specifying unit of the present disclosure and specifies a recognition region on the image information i101 from the result of the analysis process performed on the language information i106 by the language analysis unit 170 using the conversion result by the language image position information conversion unit 176. When the recognition region specifying unit 178 specifies the recognition region on the image information i101, the recognition region specifying unit 178 notifies the image processing unit 110 of execution of the recognition of the object in the specified region.

For example, when it is understood from the result of the analysis process performed on the language information i106 by the language analysis unit 170 that the word "bottom right" is included in the language information i106, the language image position information conversion unit 176 determines that a region corresponding to "bottom right" in the image information i101 is designated and transmits the determination result to the recognition region specifying unit 178. The recognition region specifying unit 178 notifies the image processing unit 110 of execution of the recognition of the object in the region corresponding to "bottom right" in the image information i101.

The recognition region display unit 174 displays the fact that a certain region in the image information i101 is set as a recognition target in the image processing unit 110 to be superimposed on the image information i101. The display by the recognition region display unit 174 will be described in detail below. For example, when the middle portion of the image information i101 is set as the recognition target in the image processing unit 110, the recognition region display unit 174 indicates that the certain region in the image information i101 is set as the recognition target in the image processing unit 110 by surrounding the middle portion with a frame or darkening portions other than the middle portion. A display example of the recognition target region by the recognition region display unit 174 will be described in detail below.

The recognition object display unit 180 displays information (for example, a name) or the contour of the object recognized through the image recognition process on the image information i101 by the image processing unit 110 to be superimposed on the image information i101. The display by the recognition object display unit 180 will be described in detail below. For example, when Mt. Fuji is recognized through the image recognition process on the image information i101 by the image processing unit 110, the recognition object display unit 180 indicates that Mt. Fuji is recognized from the image information i101 by superimposing a sentence "This is Mt. Fuji," on the image information i101 or emphasizing the contour of Mt. Fuji.

The language information output unit 190 outputs the language information i105 generated by the language generation unit 130. When outputting the language information i105, the language information output unit 190 may output the language information i105 as text information or may output the language information i105 as voice information.

The example of the functional configuration of the information processing system 1 according to the embodiment of the present disclosure has been described with reference to FIG. 2. The information processing device 100 included in the information processing system 1 in FIG. 2 according to the embodiment of the present disclosure has the configuration illustrated in FIG. 2 to perform a process of deciding the process content of the image information according to the content of the language information input by the user. The information processing device 100 can perform an effective process on the image information by performing the process of deciding the process content of the image information according to the content of the language information input by the user.

1.3. Examples of Operations

Figure 10A:
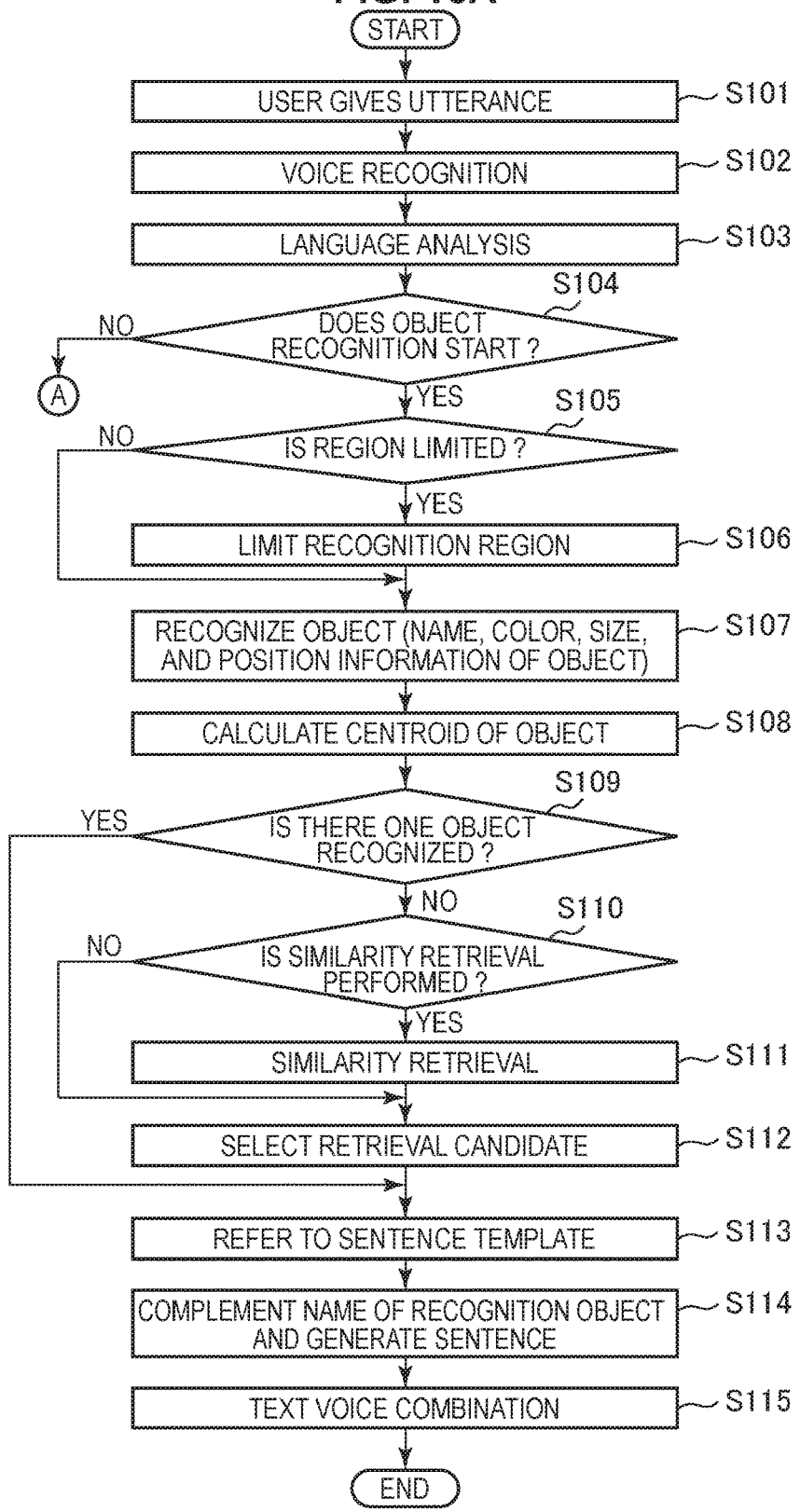
FIG. 10A is a flowchart illustrating an example of an operation of the information processing device 100 according to an embodiment of the present disclosure.
Figure 10B:
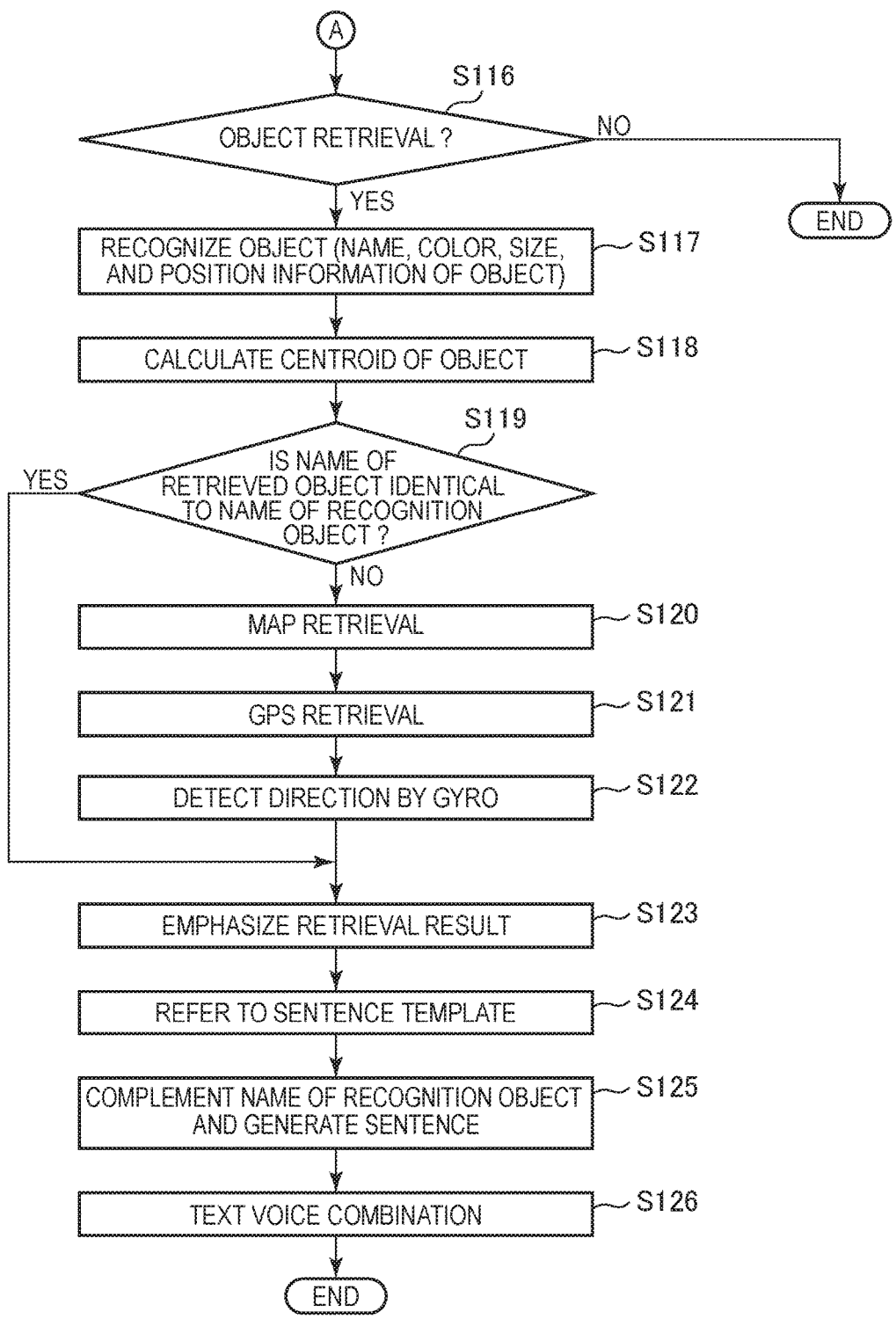
FIG. 10B is a flowchart illustrating an example of an operation of the information processing device 100 according to an embodiment of the present disclosure.

Next, examples of operations of the information processing device 100 according to an embodiment of the present disclosure will be described. FIGS. 10A and 10B are flowcharts illustrating an example of an operation of the information processing device 100 according to an embodiment of the present disclosure. FIGS. 10A and 10B illustrate an example of the operation of the information processing device 100 according to the embodiment of the present disclosure when receiving an input of the language information i106 from the language information input unit 14 and generating the language information i105 indicating the recognition result of the image information i101. Hereinafter, the example of the operation of the information processing device 100 according to the embodiment of the present disclosure will be described with reference to FIGS. 10A and 10B.

When the user gives an utterance to the language information input unit 14 of the head-mounted display 10 (step S101), the information processing device 100 performs voice recognition on content uttered by the user to acquire the language information i106 from the language information input unit 14 (step S102). The information processing device 100 acquiring the language information i106 from the language information input unit 14 performs a language analysis process on the language information i106 (step S103). The language analysis process of step S103 is performed by the language analysis unit 170.

Subsequently, the information processing device 100 determines whether content for starting object recognition is included in the language information i106 input by the user as a result of the language analysis process in the foregoing step S103 (step S104). The process content specifying unit 114 can perform the process of step S104. For example, when the language information i106 input by the user is content for inquiring about the name of an object, such as "What is that?" the information processing device 100 determines that the object recognition starts.

When it is understood from the result of the determination of the foregoing step S104 that the content for starting the object recognition is included in the language information i106 input by the user (Yes in step S104), the information processing device 100 subsequently determines whether content for limiting the region is included in the language information i106 input by the user from the result of the language analysis process of the foregoing step S103 (step S105). The process content specifying unit 114 can perform the process of step S105. For example, when the language information i106 input by the user is content for limiting the region and inquiring about the name of the object, such as "What is located on the bottom right?" the information processing device 100 determines that the content for limiting the region is included in the language information i106 input by the user.

When it is understood from the result of the determination of the foregoing step S105 that content for limiting the region is included in the language information i106 input by the user (Yes in step S105), the information processing device 100 subsequently performs the process of limiting the region in which the object is recognized in the image information i101 (step S106). For example, the language image position information conversion unit 176 and the recognition region specifying unit 178 can perform the process of limiting the region in step S106. Conversely, when it is understood from the result of the determination of the foregoing step S105 that the content for limiting the region is not included in the language information i106 input by the user (No in step S105), the information processing device 100 skips the process of step S106.

The process of limiting the region in which the object is recognized in the image information i101 will be described in detail below. For example, when it is understood through the analysis process that the language information i106 input by the user is "What is located on the bottom right?" the language analysis unit 170 transmits the language information "bottom right" to the language image position information conversion unit 176. The language image position information conversion unit 176 determines that the language information "bottom right" is a region "I" in FIG. 3 with reference to the language position information correspondence table i102. The language image position information conversion unit 176 transmits information regarding the region "I" in FIG. 3 to the recognition region specifying unit 178. The recognition region specifying unit 178 instructs the image processing unit 110 to perform the object recognition process on the region "I." The image processing unit 110 performs the object recognition process on the region "I."

Figure 8:
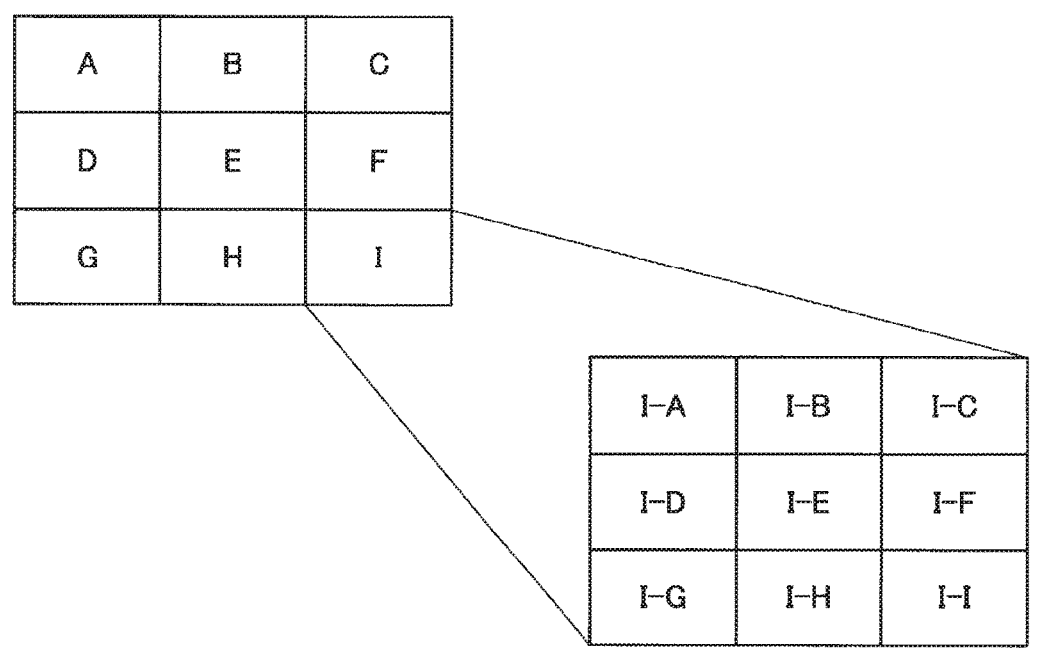

For example, when it is understood through the analysis process that an adverb indicating a degree is assigned to the language information i106 input by the user, such as "What is located tremendously on the bottom right?" or "What is located a little to the left?" the language image position information conversion unit 176 subdivides the divided recognition target region. Upon subdividing the divided recognition target region, the language image position information conversion unit 176 uses the degree adverb level table i103. FIG. 7 is an explanatory diagram illustrating combinations of divided regions and the levels of degree adverb when each region is subdivided. FIG. 8 is an explanatory diagram illustrating a subdivision example of an image region of image information i101. FIG. 8 is an explanatory diagram illustrating regions with letters when the region "I" is subdivided.

For example, when the language information i106 input by the user includes an expression "tremendously on the bottom right," the language image position information conversion unit 176 decides 3 regions "I-F," "I-H," and "I-I" obtained by subdividing the region "I" as regions of "tremendously on the bottom right" in FIG. 8 because the expression "bottom right" is the region "I" from the language position information correspondence table i102 and the degree adverb "tremendously" is "high." Then, the recognition region specifying unit 178 specifies the regions decided by the language image position information conversion unit 176 as recognition target regions.

Subsequently, the information processing device 100 performs the object recognition process on the image information i101 (step S107). For example, the image processing unit 110, specifically, the object recognition unit 111, performs the object recognition process of step S107. The information processing device 100 acquires the name of the object, the color of the object, and the size or position of the object in the image information i101 through the object recognition process of step S107. The information processing device 100 can perform, for example, a known object recognition process when performing the recognition process of step S107. A technology for recognizing an object such as a person or an automobile from an input image and recognizing what the recognized object is is widely known, and thus the object recognition process is widely practically applied to, for example, an automatic shutter of a camera or a monitoring camera. Specifically, the object recognition process is a process of ascertaining what is shown from an input image by recognizing an object in the input image through input image analysis and acquiring what the recognized object is, for example, by acquiring the recognized object through retrieval in a database.

When the object included in the image information i101 is recognized in step S107, the information processing device 100 subsequently calculates the centroid of the recognized object to extract where the recognized object is in the image (step S108). For example, the image processing unit 110, specifically, the object position information extraction unit 113, performs the process of step S108. In step S108, for example, the centroid of the recognized object may be calculated by integration.

FIG. 11 is an explanatory diagram illustrating an example of the image information i101 input from the image input unit 11 to the information processing device 100. In FIG. 11, 4 objects 300, 310, 320, and 330 are included in the image information i101 and the information processing device 100 recognizes the 4 objects 300, 310, 320, and 330 through the object recognition process of the foregoing step S107. Then, the information processing device 100 obtains centroid positions 301, 311, 321 and 331 of the objects 300, 310, 320, and 330 through a centroid calculation process of the foregoing step S108.

When there are a plurality of objects recognized through the object recognition process of the foregoing step S107 and content for limiting the region is not included in the language information i106, the information processing device 100 selects one object based on a predetermined rule. The information processing device 100 may perform the object recognition process on, for example, an object near the center of the image information i101 or perform the object recognition process on the largest object, as the predetermined rule.

FIG. 3 is an explanatory diagram illustrating a division example of the image region of the image information i101. In the example illustrated in FIG. 3, in the image information i101, the region is divided equally into 3 regions along the X and Y axes based on the maximum value of the X-Y coordinates of the whole image, and then region names are given with letters A to I to the regions. When the object recognition process is performed on the object near the center of the image information i101, the information processing device 100 selects an object which has a centroid in a portion of "E" of the image information i101 as a recognition object. When the 4 objects 300, 310, 320, and 330 are included in the image information i101 as in FIG. 11, the information processing device 100 selects the object 310 as the recognition object because the centroid position 311 of the object 310 is present in the portion of "E" of the image information i101.

When there are the plurality of objects recognized through the object recognition process of the foregoing step S107 and the content for limiting the region is not included in the language information i106, the information processing device 100 selects the object 300 with the largest area as the recognition object in the image information i101 illustrated in FIG. 11 at the time of performing the object recognition process on the largest object as the predetermined rule.

Even when there are the plurality of objects recognized through the object recognition process of the foregoing step S107 and the content for limiting the region is included in the language information i106, the information processing device 100 selects the object 300 with the largest area in the limited region in the image information i101 illustrated in FIG. 11 as the recognition object at the time of performing the object recognition process on the largest object as the predetermined rule. For example, when the language information i106 input by the user is "What is located on the bottom right?" the information processing device 100 selects the object 320 with the largest area present in the bottom right portion (the region "I" in FIG. 3) of the image information i101 in the image information i101 illustrated in FIG. 11 as the recognition object.

When the centroid of the object is calculated in the foregoing step S108, the information processing device 100 subsequently determines whether the number of objects recognized through the object recognition process of the foregoing step S107 is 1 (step S109). For example, the image position language information conversion unit 120 can perform the determination of step S109.

When there are a plurality of objects recognized through the recognition process of the foregoing step S107 as the result of the determination of the foregoing step S109 (No in step S109), the information processing device 100 subsequently determines whether content for performing object similarity retrieval is included in the language information i106 through analysis of the language information i106 input by the user (step S110). The process content specifying unit 114 can perform the process of step S110. For example, when the language information i106 input by the user is content for inquiring about the name of the object, such as "What is that that looks like a rocket?" and content for performing the object similarity retrieval, the information processing device 100 determines that the content for performing the object similarity retrieval is included in the language information i106 input by the user.

When it is understood from the result of the determination of the foregoing step S110 that the content for performing the object similarity retrieval is included in the language information i106 (Yes in step S110), the information processing device 100 performs the object similarity retrieval (step S111). For example, the similar image retrieval unit 172 performs the similarity retrieval process of step S111. When the language information i106 is "What is that that looks like a rocket?" as in the above-described example, the information processing device 100 performs the similarity retrieval on the image of the rocket and the image of the object recognized through the object recognition process in step S111.

When performing the object similarity retrieval, the information processing device 100 calculates the similarity which is an index indicating how similar the object included in the image information i101 is to the object included in the language information i106. The information processing device 100 calculates the similarity using the technology disclosed in JP 2010-3021A, for example, as described above.

When the information processing device 100 performs the object similarity retrieval in the foregoing step S111, the information processing device 100 subsequently selects a retrieval candidate (step S112). Specifically, the information processing device 100 acquires the result of the object similarity retrieval of the foregoing step S111 and selects the object with the highest similarity among the plurality of recognition objects. For example, the object recognition unit 111 can perform the selection process of step S111.

When the number of objects recognized in the object recognition process of the foregoing step S107 is only 1 (Yes in step S109) or the retrieval candidate is selected in the foregoing step S112, the information processing device 100 subsequently refers to the sentence generation template i104 (step S113). For example, the language generation unit 130 performs the referring process of step S113.

Figure 9:
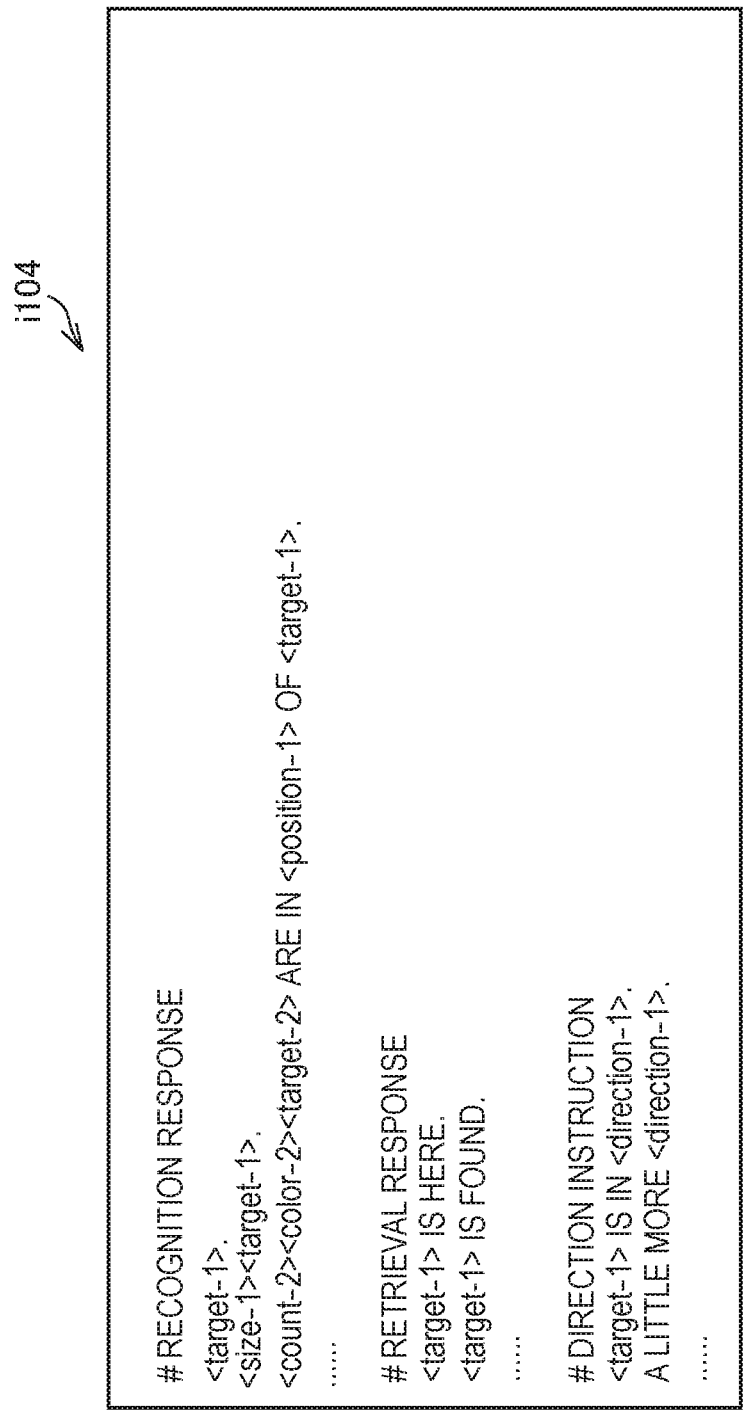
FIG. 9 is an explanatory diagram illustrating an example of a sentence generation template i104 used by the information processing device 100.

FIG. 9 is an explanatory diagram illustrating an example of a sentence generation template i104 used by the information processing device 100. The sentence generation template i104 illustrated in FIG. 9 includes a response template of the object recognition process, a response template of the object retrieval process, and a response template of a direction instruction process.

In step S113, the information processing device 100 refers to the response template of the object recognition process included in the sentence generation template i104. The name of the object obtained through the recognition process of the object recognition unit 111 can be applied to a tag <target-n> (where n=1, 2, ... ) of the sentence template i104 illustrated in FIG. 9. The size of the object obtained through the recognition process of the object recognition unit 111 can be applied to a tag <size-n> (where n=1, 2, ... ). The language information regarding the position of the image obtained from the conversion process of the image position language information conversion unit 120 can be applied to a tag <position-n> (where n=1, 2, ... ). The color information regarding the object obtained from the RGB color name conversion unit 150 can be applied to a tag <color-n> (where n=1, 2, ... ).

When the information processing device 100 refers to the sentence generation template i104 in the foregoing step S113, the information processing device 100 subsequently complements the name of the object recognized through the object recognition process of the foregoing step S107 to the template of the sentence generation template i104 and generates the sentence (step S114). For example, the language generation unit 130 performs the generation process of step S114. Through the process of step S114, the information processing device 100 can generate the language information i105 as a response to the object recognition process.

For example, when the number of objects included in the image information i101 is only 1 and the object can be recognized as Mt. Fuji through the recognition process of the object recognition unit 111, the information processing device 100 generates the language information i105 "That is Mt. Fuji," with reference to the sentence generation template i104.

When the user further gives an utterance "What is located more to the right?" the language analysis unit 170 determines that an instruction to perform recursive division, "more," is given and the language image position information conversion unit 176 narrows down the region from the position information indicating a direction "right." The language image position information conversion unit 176 uses the language position information correspondence table i102 to decide the narrowed-down region. In this case, the language image position information conversion unit 176 further narrows down the original bottom right region "I" and decides the region "I-F" as a recognition target region.

When the language image position information conversion unit 176 re-decides the recognition target region and subsequently an expression meaning cancellation, for example, an expression including the words "after all," "previous," or "original," is input as the language information i106 by the user, the language image position information conversion unit 176 returns the recognition target region to the immediately previous decided recognition target region.

In the example of the image information i101 illustrated in FIG. 11, when the information processing device 100 first recognizes the object 320 as the bottom right object, the information processing device 100 can narrow down the recognition regions to the regions "I-C," "I-F," and "I-I" in FIG. 8 in response to the utterance "What is located more to the right?" of the user and recognize the object 330 located in the regions. Then, the information processing device 100 can generate the language information i105, for example, "That is a person." with reference to the sentence generation template i104. The recursive division process may be repeated several times and the information processing device 100 may narrow down the recognition regions step by step according to the utterance of the user.

The information processing device 100 may obtain the area of the recognition object from the contour of the recognition object and express the size of the recognition object in language according to a ratio of the area of the recognition object to the entire screen. For example, when the area of the recognition object is 30% or more of the area of the entire screen, the recognition object is defined to be "large." When the area of the recognition object is 3% or less, the recognition object is defined to be "small." In the example of the image information i101 illustrated in FIG. 11, the information processing device 100 can generate the language information i105, for example, "That is the small Tokyo Tower," or "That is the large Mt. Fuji."

The language generation unit 130 may generate the language information i105 according to the extent of the object recognition result based on the language information i106 by the object recognition unit 111. For example, when the content for performing the object similarity retrieval is included in the language information i106, the information processing device 100 may change the content of the language information i105 generated according to the calculated similarity. For example, when the language information i106 is an inquiring sentence, such as "What is that object that looks like a rocket?" and the similarity calculated through the object similarity retrieval is equal to or greater than a certain threshold value, the information processing device 100 may generate the language information i105 for asserting "That is Tokyo Tower." When the similarity is lower than the threshold value, the information processing device 100 may generate the language information i105 with an expression of lowered certainty, such as "I think that is a tower," or "That might be a tower." When the similarity calculated through the object similarity retrieval is less than a predetermined threshold value, the information processing device 100 may generate the language information i105 with an expression of no certainty, such as "I don't know."

The information processing device 100 can obtain the color of the recognition object. RGB information regarding the recognition object is transmitted to the RGB color name conversion unit 150, and thus RGB color name conversion unit 150 can obtain a representative color of the recognition object. For example, a color which occupies the largest area in the recognition object can be set as the representative color.

The color information obtained by the RGB color name conversion unit 150 is delivered to the language generation unit 130. The language generation unit 130 generates the sentence with reference to the sentence generation template i104, as described above. When generating the sentence, the language generation unit 130 performs sentence generation in the form of substitution of the tag <color-n> into the sentence generation template i104 with the color information obtained by the RGB color name conversion unit 150.

As described above, the contour information processing unit 140 acquires coordinate information of the contour of the object recognized by the object recognition unit 111 using information transmitted from the image processing unit 110. The contour information processing unit 140 transmits the coordinate information of the contour of the object to the image position language information conversion unit 120. When a plurality of objects are present in the image information i101, the image position language information conversion unit 120 can determine whether the objects are superimposed and generate language information according to the superimposition state by acquiring the coordinate information of the contours of the objects.

The superimposition states of the recognition objects are expressed using four patterns, "including/included," "superimposed," "touching," and "separated," in the embodiment. FIG. 12 is an explanatory diagram illustrating expressions of the superimposition states of recognition objects. FIG. 12 illustrates the superimposition states of a triangular object and a circular object which are the recognition objects. The information processing device 100 may determine the superimposition of the recognition objects in the object recognition process of the foregoing step S107 and convert a superimposition relation between the recognition objects into language using any one of the four patterns. For example, when a recognition object state is the top left state of FIG. 12, the information processing device 100 can convert the superimposition relation into language information, such as "triangle: touching: circle."

When two recognition objects are superimposed, the information processing device 100 may express the degree of superimposition in accordance with the degree of ratio of a superimposition area. For example, when two recognition objects, Objects 1 and 2, are superimposed and the area of a superimposed portion of Objects 1 and 2 is equal to or less than 25% of Object 1, the information processing device 100 may set the degree of superimposition to "Low." When the area of the superimposed portion is equal to or greater than 75%, the degree of superimposition may be set to "High." In other cases, the degree of superimposition may be set to "Intermediate." The contour information processing unit 140 may decide the degree of superimposition. When two recognition objects are separated, the information processing device 100 may obtain a distance between the centroids of the recognition objects and decide degree information according to the distance between the centroids of the recognition objects. When the distance between the centroids of the recognition objects is less than, for example, 25% of a diagonal length of the entire screen, the information processing device 100 may set the degree of separation distance to "Low." When the distance between the centroids of the recognition objects is equal to or greater than 75%, the degree of separation distance may be set to "High." In the other cases, the degree of separation distance may be se to "Intermediate."

Figure 13:
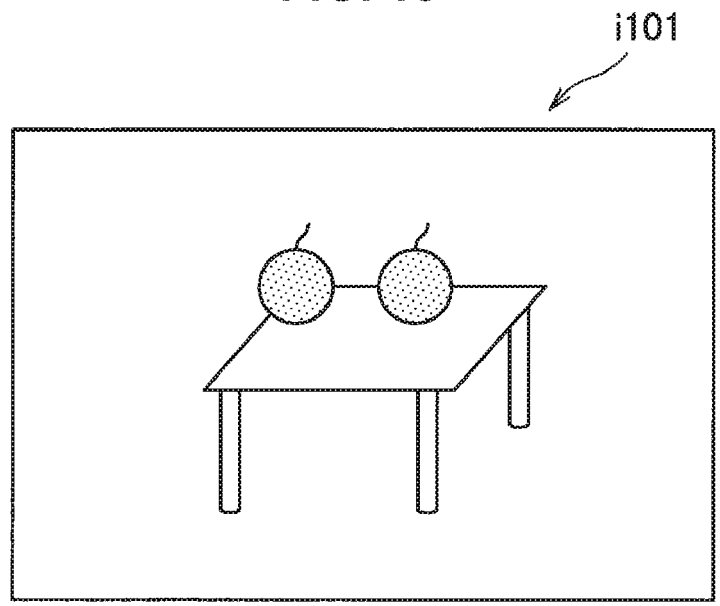
FIG. 13 is an explanatory diagram illustrating an example of the image information i101 input from an image input unit 11 to the information processing device 100.

FIG. 13 is an explanatory diagram illustrating another example of the image information i101 input from the image input unit 11 to the information processing device 100. FIG. 13 illustrates a state in which two red apples are placed as the image information i101 on a desk. Accordingly, when the image information i101 illustrated in FIG. 13 is processed by the information processing device 100, the language generation unit 130 of the information processing device 100 can generate a sentence "There are two red apples on the desk," or "Two red apples are on the desk," rather than "There are a red apple and a red apple on the desk," through the above-described series of processes.

Figure 14:
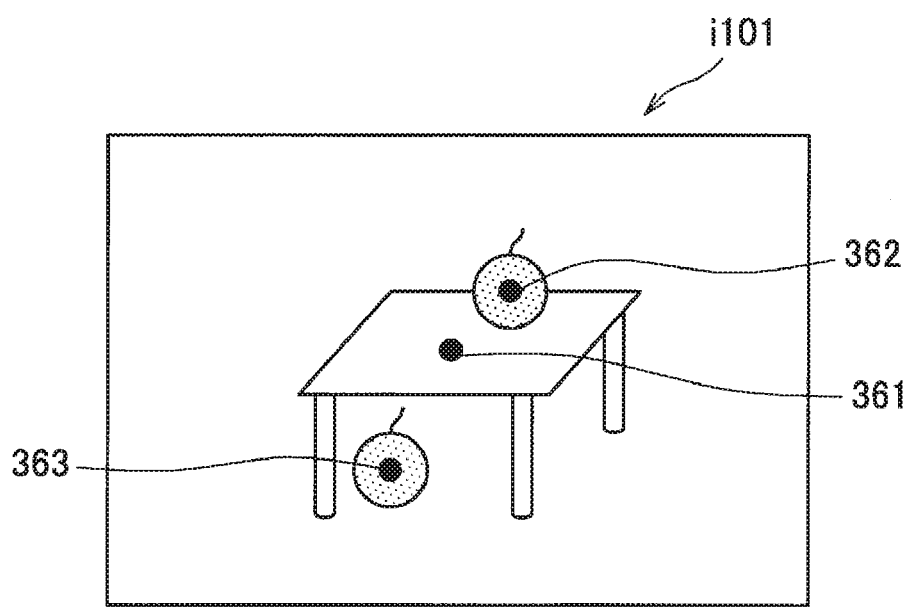
FIG. 14 is an explanatory diagram illustrating an example of the image information i101 input from an image input unit 11 to the information processing device 100.

FIG. 14 is an explanatory diagram illustrating still another example of the image information i101 input from the image input unit 11 to the information processing device 100. FIG. 14 illustrates the image information i101 in which there are two red apples on a desk. Accordingly, when the image information i101 illustrated in FIG. 14 is processed by the information processing device 100, the language generation unit 130 of the information processing device 100 can generate a sentence "There are red apples on and under the desk," through the above-described series of processes.

When the name of the object is complemented to the template and the sentence is generated in the foregoing step S114, the information processing device 100 subsequently outputs, for example, a sentence generated by performing voice combination on the text (step S115). For example, the language information output unit 190 can perform the output process of step S115. Of course, it is needless to say that the information processing device 100 may output the language information i105 merely as a text string rather than the voice combination. When the language information i105 is output as the text string, the information processing device 100 outputs the language information i105 to, for example, the display device 13 of the head-mounted display 10.

Conversely, when it is understood from the result of the determination of the foregoing step S104 that the content for starting the object recognition is not included in the language information i106 input by the user (No in step S104), the information processing device 100 subsequently determines whether content for performing the object retrieval and starting a process of acquiring information regarding the object is included in the language information i106 input by the user in the result of the language analysis process of the foregoing step S103 (step S116). For example, the process content specifying unit 114 can perform the process of step S116.

When it is understood from the result of the determination of the foregoing step S116 that the content for performing the object retrieval and starting the process of acquiring the information regarding the object is not included in the language information i106 input by the user (No in step S116), the information processing device 100 ends the process without performing the process on the language information i106 input by the user. Conversely, when it is understood from the result of the determination of the foregoing step S116 that the content for performing the object retrieval and starting the process of acquiring the information regarding the object is included in the language information i106 input by the user (Yes in step S116), the information processing device 100 subsequently performs the object recognition process on the image information i101 (step S117). For example, the image processing unit 110, specifically, the object recognition unit 111, performs the object recognition process of step S117. The information processing device 100 acquires the information regarding the object, specifically, the name of the object, the color of the object, and the size or position of the object in the image information i101, through the object recognition process of step S117.

When the object included in the image information i101 is recognized in step S117, the information processing device 100 subsequently calculates the centroid of the recognized object to extract where the recognized object is in the image (step S118). For example, the image processing unit 110, specifically, the object position information extraction unit 113, performs the process of step S118. In step S118, for example, the centroid of the recognized object may be calculated by integration.

When the centroid of the object is calculated in the foregoing step S118, the information processing device 100 subsequently determines whether the name of the object included in the language information i106 input by the user is identical to the name of the object recognized in the foregoing step S117 (step S119). For example, the object recognition unit 111 performs the determination process of step S119. For example, when the language information i106 input by the user is "Where is Mt. Fuji?" the language information i106 is determined to indicate search for the location of Mt. Fuji through the morphological analysis, and the object recognized in the foregoing step S117 is Mt. Fuji, the information processing device 100 can determine that the name of the object included in the language information i106 input by the user is identical to the name of the object recognized in the foregoing step S117.

When it is understood from the result of the determination of the foregoing step S119 that the name of the object included in the language information i106 input by the user is not identical to the name of the object recognized in the foregoing step S117 (No in step S119), the information processing device 100 subsequently determines a direction and a distance of a goal object (that is, the name of the object included in the language information i106) from the current position of the user. In the embodiment, when performing the determination, the information processing device 100 performs map retrieval using the map information i108 (step S120), GPS retrieval using information regarding the current position acquired by the GPS terminal 15 (step S121), and direction detection using information regarding the direction of the head-mounted display 10 acquired by the gyro sensor 16 (step S122).

Conversely, when it is understood from the result of the determination of the foregoing step S119 that the name of the object included in the language information i106 input by the user is identical to the name of the object recognized in the foregoing step S117 (Yes in step S119), the processes of the foregoing steps S120 to 122 are skipped.

Subsequently, the information processing device 100 performs a process of emphasizing the retrieval result (step S123). For example, the recognition object display unit 180 can perform the process of emphasizing the retrieval result in step S123. When the name of the object included in the language information i106 input by the user is identical to the name of the object recognized in the foregoing step S117, the information processing device 100 performs the process of emphasizing the object recognized in the foregoing step S117. Examples of the process of emphasizing the recognized object include various processes of surrounding the image information i101 or the position of the recognition object viewed through the display device 13 of the head-mounted display 10 with a frame, surrounding the recognition object with a frame and then lighting the frame, emphasizing the contour of the recognition object, indicating the recognition object by an arrow, and hatching the recognition object or a region other than a frame surrounding the recognition object.

Subsequently, the information processing device 100 refers to the sentence generation template i104 (step S124). For example, the language generation unit 130 performs the referring process of step S124. In step S124, the information processing device 100 refers to the response template of the object retrieval process included in the sentence generation template i104.

When the information processing device 100 refers to the sentence generation template i104 in the foregoing step S124, the information processing device 100 subsequently complements the name of the object recognized through the object recognition process of the foregoing step S117 to the template of the sentence generation template i104 and generates the sentence (step S125). For example, the language generation unit 130 performs the generation process of step S125. Through the process of step S125, the information processing device 100 can generate the language information i105 as a response to the object recognition process.

For example, when the user inputs the language information i106 "Where is Mt. Fuji?" the language information i106 is determined to mean search for the location of Mt. Fuji through the morphological analysis of the language analysis unit 170, and Mt. Fuji can be recognized from the image information i101 through the recognition process of the object recognition unit 111, the information processing device 100 generates the language information i105 "Mt. Fuji is here," with reference to the sentence generation template i104.

When the name of the object is complemented to the template and the sentence is generated in the foregoing step S125, the information processing device 100 subsequently outputs, for example, a sentence generated by performing voice combination on the text (step S126). For example, the language information output unit 190 can perform the output process of step S126.

Figure 15:
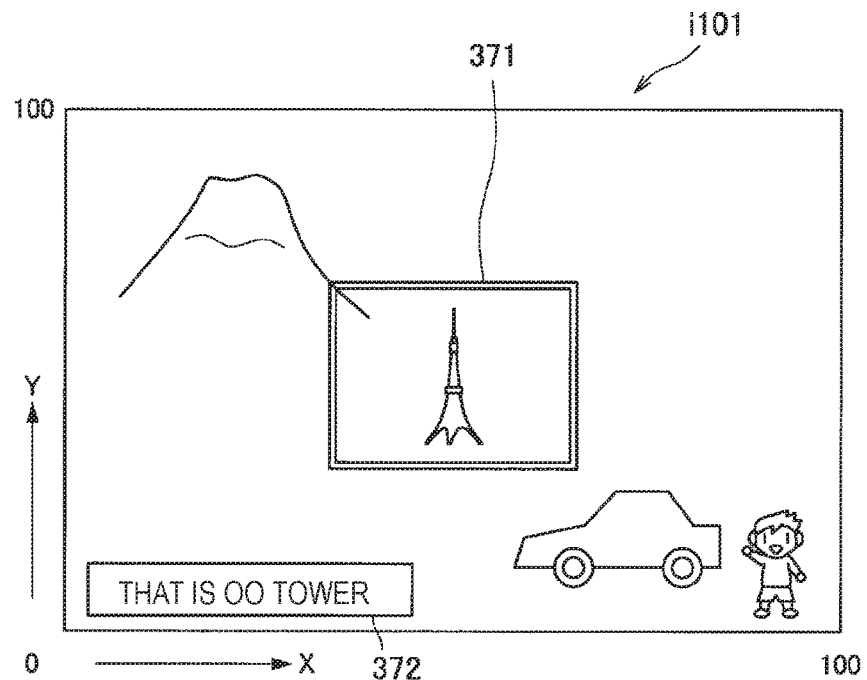
FIG. 15 is an explanatory diagram illustrating an output example of a result of an object recognition process by the information processing device 100.
Figure 16:
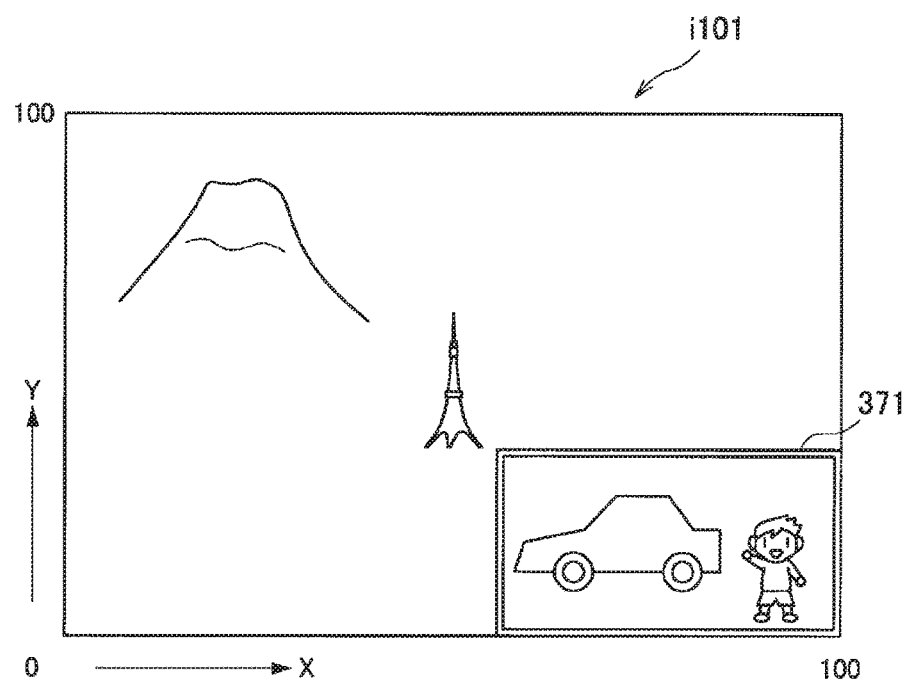
FIG. 16 is an explanatory diagram illustrating an output example of a result of an object recognition process by the information processing device 100.
Figure 18:
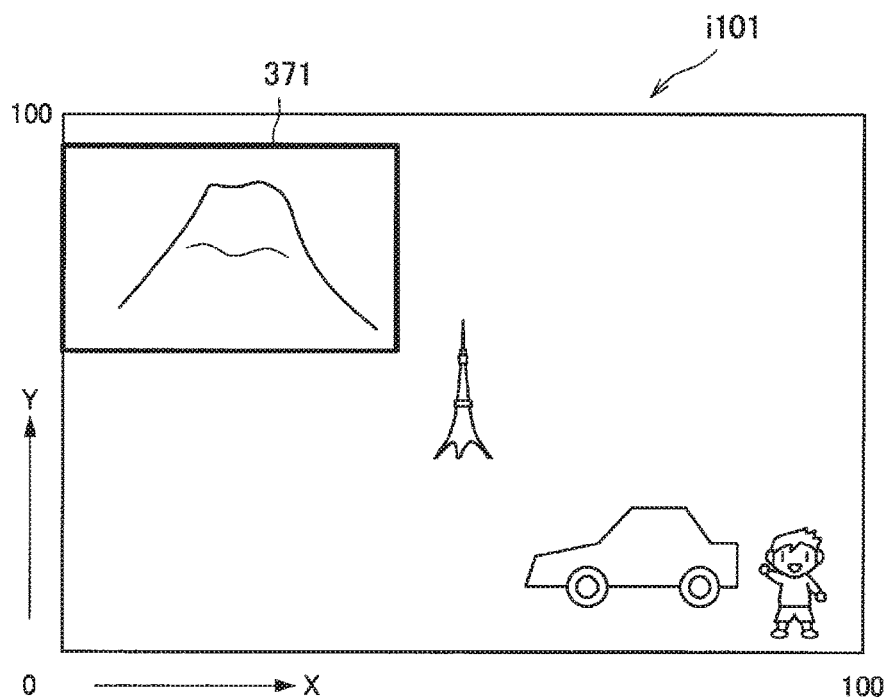
FIG. 18 is an explanatory diagram illustrating an output example of a result of an object recognition process by the information processing device 100.

The information processing device 100 may present a target region of the object recognition to the user so that the user can easily know the target region. FIGS. 15, 16, and 18 are explanatory diagrams illustrating output examples of results of the object recognition process by the information processing device 100 and explanatory diagrams illustrating examples in which a recognition region is displayed when the information processing device 100 performs the object recognition process on the image information i101. FIG. 15 illustrates an example in which a recognition object in the image information i101 is an object located in a middle portion, and the recognition object is surrounded by a frame 371 and a region 372 where the language information i105 generated in step S125 is displayed is then superimposed on the image information i101. FIG. 16 illustrates an example in which a recognition object in the image information i101 is an object located in a bottom right portion and the recognition object is surrounded by the frame 371.

FIG. 18 illustrates an example of the recognition result displayed when the user utters, for example, "Where is Mt. Fuji?" and an example in which a recognition object in the image information i101 is an object located in a top left portion and the recognition object is surrounded by the frame 371. The information processing device 100 can determine a direction and a distance of a goal object from the current position of the user on whom the head-mounted display 10 is mounted by using information acquired by the GPS terminal 15, information acquired by the gyro sensor 16, and the map information i108.

Figure 17:
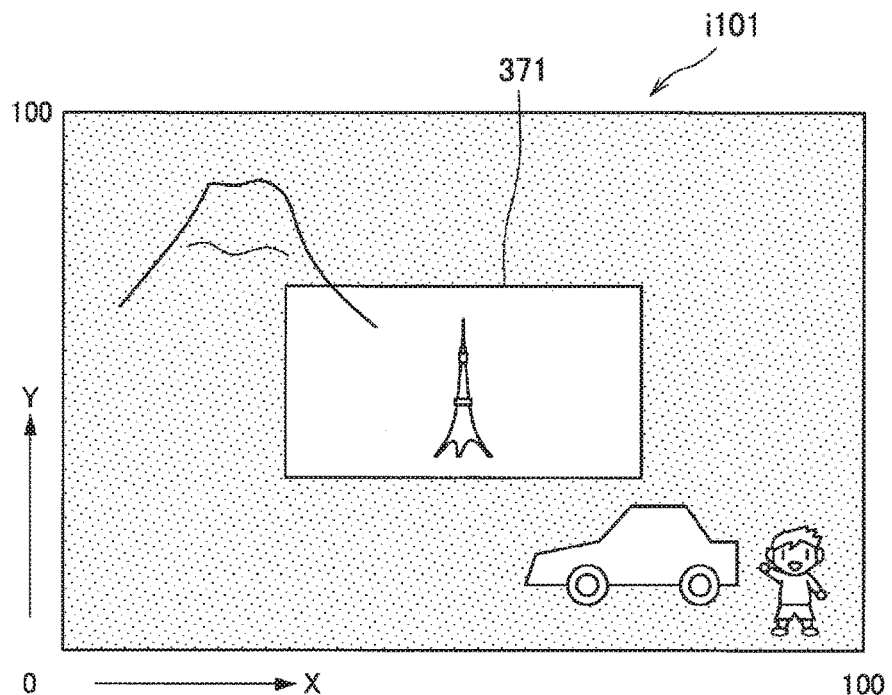
FIG. 17 is an explanatory diagram illustrating an example in which an object recognized by the information processing device 100 is displayed with emphasis.

FIG. 17 is an explanatory diagram illustrating an example in which an object recognized by the information processing device 100 is displayed with emphases. FIG. 17 illustrates an example in which a recognition object in the image information i101 is an object located in a middle portion, and the recognition object is surrounded by the frame 371 and a region not surrounded by the frame 371 is then hatched.

Figure 19:
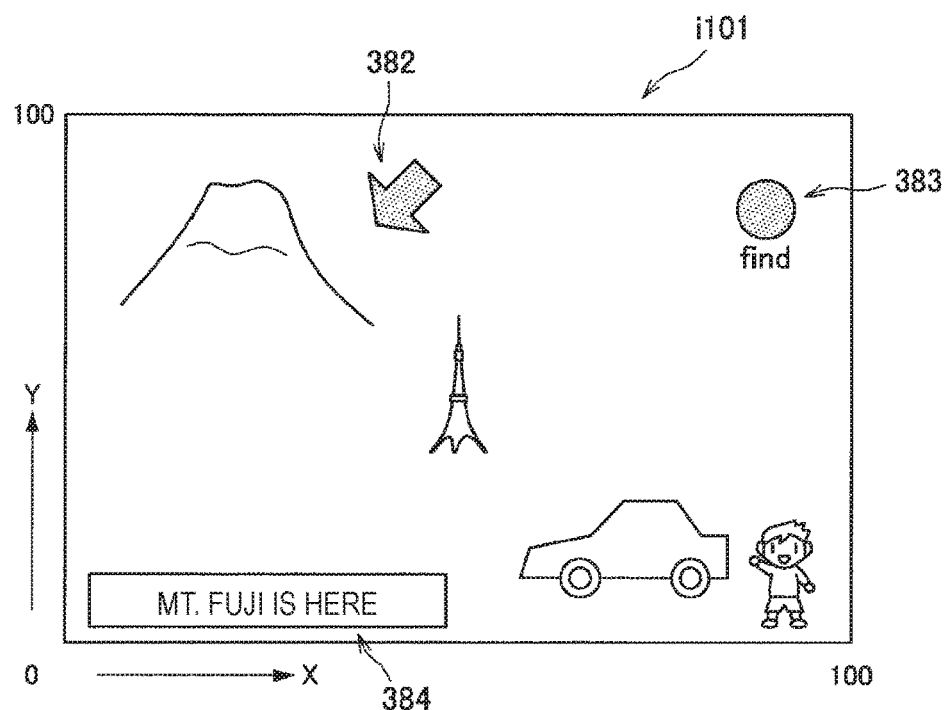
FIG. 19 is an explanatory diagram illustrating an example in which a recognition result is displayed when the information processing device 100 performs an object recognition process on the image information i101.

FIG. 19 is an explanatory diagram illustrating an example in which a recognition result is displayed when the information processing device 100 performs the object recognition process on the image information i101. FIG. 19 illustrates an example of a recognition result displayed when the user utters, for example, "Where is Mt. Fuji?" When Mt. Fuji is recognized from the image information i101 in the result obtained by performing the object recognition process on the image information i101, the information processing device 100 may display an arrow 382 indicating Mt. Fuji on the head-mounted display 10 or may display a mark 383 indicating that the goal object (Mt. Fuji) is found on the head-mounted display 10. When Mt. Fuji can be recognized from the image information i101, the information processing device 100 may display a sentence 384 "Mt. Fuji is here," on the head-mounted display 10 in addition to the indication of Mt. Fuji by the arrow 382.

In some situations, no object can be recognized from the image information i101. For example, a case in which weather is bad and Mt. Fuji may not be recognized from the image information i101 is considered. In this case, the information processing device 100 can specify a location where Mt. Fuji was originally present in the image information i101 by using the information acquired by the GPS terminal 15, the information acquired by the gyro sensor 16, or the map information i108.

Figure 20:
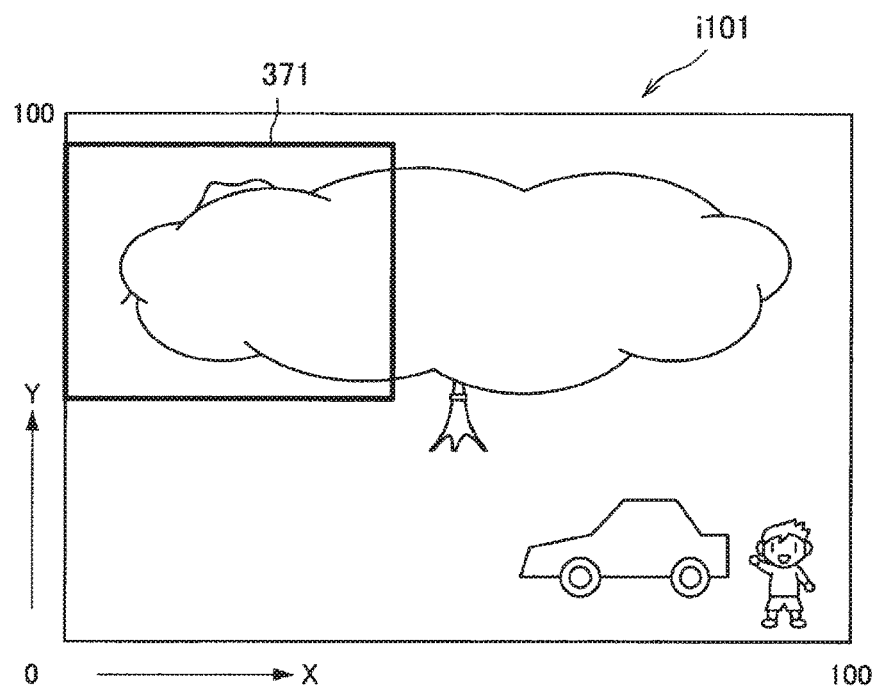
FIG. 20 is an explanatory diagram illustrating an example in which a recognition result is displayed when the information processing device 100 performs an object recognition process on the image information i101.

FIG. 20 is an explanatory diagram illustrating an example in which a recognition result is displayed when the information processing device 100 performs an object recognition process on the image information i101. FIG. 20 illustrates an example of the recognition result displayed in the image information i101 showing a state in which Mt. Fuji is hidden by clouds when the user utters, for example, "Where is Mt. Fuji?" Thus, Mt. Fuji is hidden by clouds and is not visible, but the information processing device 100 can specify the location where Mt. Fuji was originally present by using the information acquired by the GPS terminal 15, the information acquired by the gyro sensor 16, or the map information i108 and surround the location with the frame 371 to display the location on the head-mounted display 10.

The examples of the operations of the information processing device 100 according to the embodiment of the present disclosure were described above with reference to FIGS. 10A and 10B.

In the above description, the example in which the language information i106 input by the user specifies the position as in "What is that object located on the bottom right?" has been described. However, the language information i106 input by the user may specify, for example, a feature such as the color, the size, the shape, or the like of an object. For example, when the language information i106 input by the user is "What is that large red thing?" the information processing device 100 may recognize a large red object in the image information i101 and generate the language information i105 generated in regard to the object. Of course, it is needless to say that both of the position and the feature of the language information i106 input by the user may be specified. That is, when the language information i106 input by the user is "What is that large red object on the bottom right?" the information processing device 100 may recognize the large red object in the bottom right portion of the image information i101 and generate the language information i105 generated in regard to the object.

When a positional relation between a recognition target object and another object in the image information i101 is designated, the information processing device 100 can also acquire the name of any recognition object from a plurality of recognition objects. For example, in the case of the image information i101 illustrated in FIG. 11, the user is assumed to utter "What is to the right of the tower?" at a time point at which the object 310 (tower) located in the middle portion of the screen is recognized. Since "tower" is recognized in advance and the name of the object is further uttered, the language analysis unit 170 determines that "tower" is the name of the object serving as the origin of the recognition. The language image position information conversion unit 176 decides the recognition region from the words "tower" and "right" and the recognition region specifying unit 178 specifies the positive direction from the centroid position 311 of the object 310 in the X coordinate direction by the decision of the language image position information conversion unit 176.

In this case, the information processing device 100 may set the recognition region again based on an utterance of the user or the like and perform the object recognition. When there is an object acquired in the positive direction in the X coordinate direction, the information processing device 100 may use a result of the recognition object.

For example, in the case of the image information i101 illustrated in FIG. 11, when the user utters "What is located to the right of the tower?" the information processing device 100 can recognize two objects, the objects 320 and 330. However, since the object 320 is close to the object 310, the information processing device 100 can generate a sentence "That is an automobile," as the language information i105. Of course, the information processing device 100 may decide an object closest to an object serving as the origin as the recognition object or may decide an object with the largest area in a re-recognition region as the recognition object.

When the user utters content including an adverb indicating a degree such as "a little" or "quite" as in "What is located a little to the right of the tower?" or "What is located quite to the right of the tower?" the information processing device 100 may change a selection range in accordance with the magnitude of a level corresponding to the adverb. When the user utters content designating a difference in an attribute, such as "What is that thing that is redder than the tower?" or "What is that thing that is larger?" as well as the positional relation, the information processing device 100 may narrow down the recognition object by the attribute.

Figure 21:
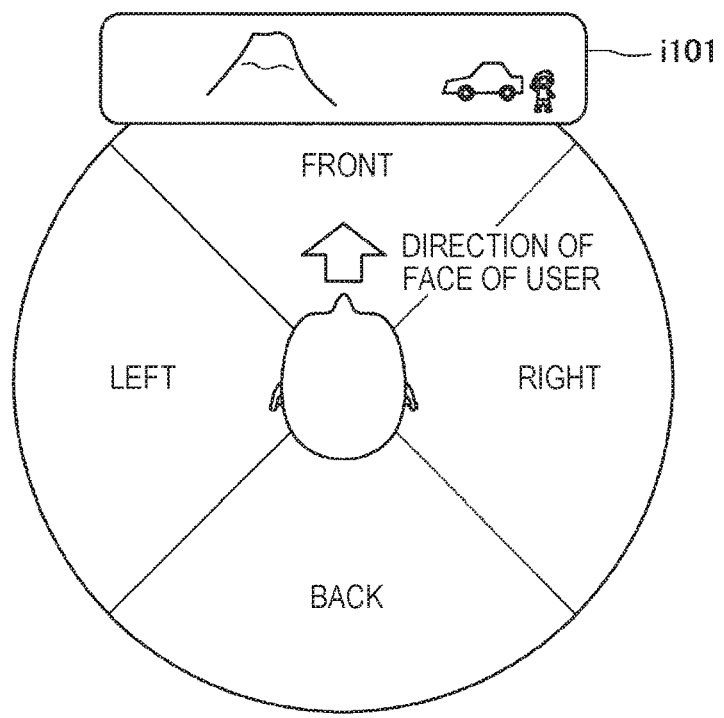
FIG. 21 is an explanatory diagram illustrating an example of a positional relation between the image information i101 and the direction of a user.

When there is no recognition object in the image information i101, the information processing device 100 may detect a direction in which the object is located using information acquired by the gyro sensor 16 or may notify the user of the direction in which the object is located. FIG. 21 is an explanatory diagram illustrating an example of a positional relation between the image information i101 and the direction of the user. The information processing device 100 gives the user an instruction of a direction of a recognition target object from the user's point of view according to correspondence of the language information in the direction of the target object with respect to the direction of the user.

For example, when it is understood that Mt. Fuji is behind the user by using information acquired by the gyro sensor 16, the information processing device 100 can generate a sentence using a direction instruction template of the sentence generation template i104. Specifically, the information processing device 100 can generate a sentence, for example, "Mt. Fuji is behind you," by applying information regarding a direction to a tag <direction-n> (where n=1, 2, . . . ) of the direction instruction template of the sentence generation template i104. Then, the information processing device 100 can give the user an instruction based on the generated sentence. For example, when the user moves within a field angle of 30 degrees in the horizontal direction in order for the goal object to be included in the image information i101 (that is, in order for the goal object to enter the field of view of the user), the language generation unit 130 can generate a sentence such as "A little more to the right," or A little more to the left," by applying information such as "right" or "left" to the tag <direction-n> of the direction instruction template of the sentence generation template i104.

In the above-described embodiment, the instruction to prompt start of the object recognition is given with the utterance of the user, but the present disclosure is not limited to related examples. For example, a predetermined signal transmitted to the information processing device 100, for example, a signal generated according to a user manipulation on a button, a keyboard, a switch, or the like included in the head-mounted display 10, may be used as a trigger of the start of the object recognition in the information processing device 100.

The information processing device 100 may recognize a hand or a finger of the user using the head-mounted display 10 when performing the object recognition process and recognize an object in a direction in which the finger of the user points. When the object in the direction in which the finger of the user points is recognized, the information processing device 100 recognizes the hand and the finger in the image information i101 and sets the positive direction on the Y axis from the centroid of a region recognized by the hand or the finger as the direction of the target object.

Figure 22:
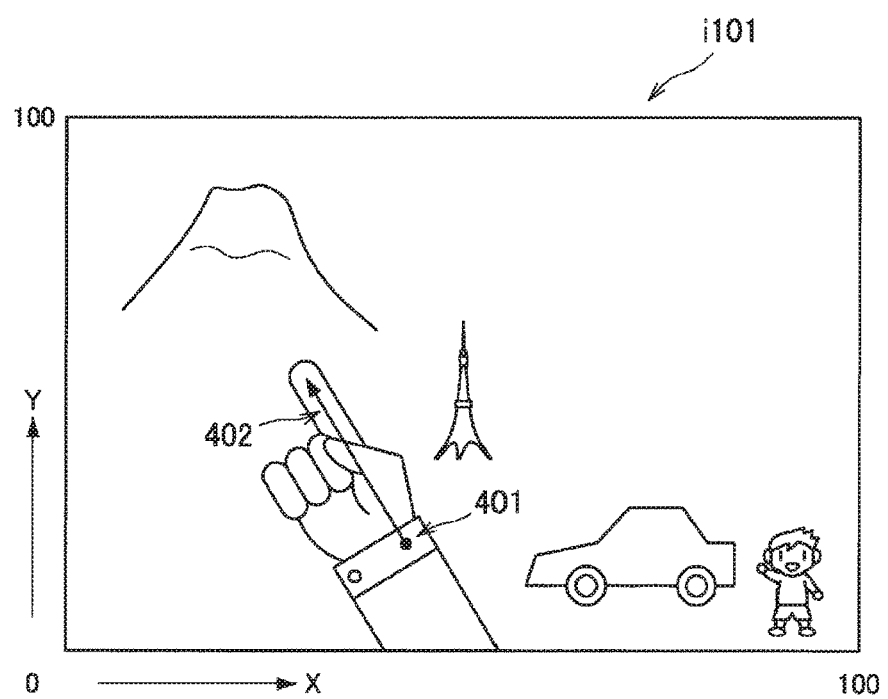
FIG. 22 is an explanatory diagram illustrating an example of the image information i101 input from an image input unit 11 to the information processing device 100.

FIG. 22 is an explanatory diagram illustrating an example of the image information i101 input from an image input unit 11 to the information processing device 100. FIG. 22 illustrates an example in which the hand of the user using the head-mounted display 10 is included in the image information i101. Reference numeral 401 denotes a centroid position of the region recognized by the hand and the finger and reference numeral 402 denotes a vector oriented from the centroid position 401 to the tip of the finger of the user. When the vector 402 is obtained through the object recognition process on the image information i101, the information processing device 100 recognizes an object in the direction of the vector 402 as a target object. In the example illustrated in FIG. 22, the information processing device 100 can recognize Mt. Fuji and generate a sentence "That is Mt. Fuji." In this way, by recognizing the hand and the finger of the user and recognizing the object in the direction in which the finger of the user points, the information processing device 100 can recognize an object intended by the user and output a recognition result of the object as language information even when the user does not utter anything.

When the language information i105 is generated with an expression with no certainty such as "I don't know," in the result obtained through the object recognition process by the information processing device 100 and the user points to the object with his or her finger, the information processing device 100 may perform the object recognition in a state in which a threshold value of the object recognition is lowered and a probability for the object is low.

Figure 23:
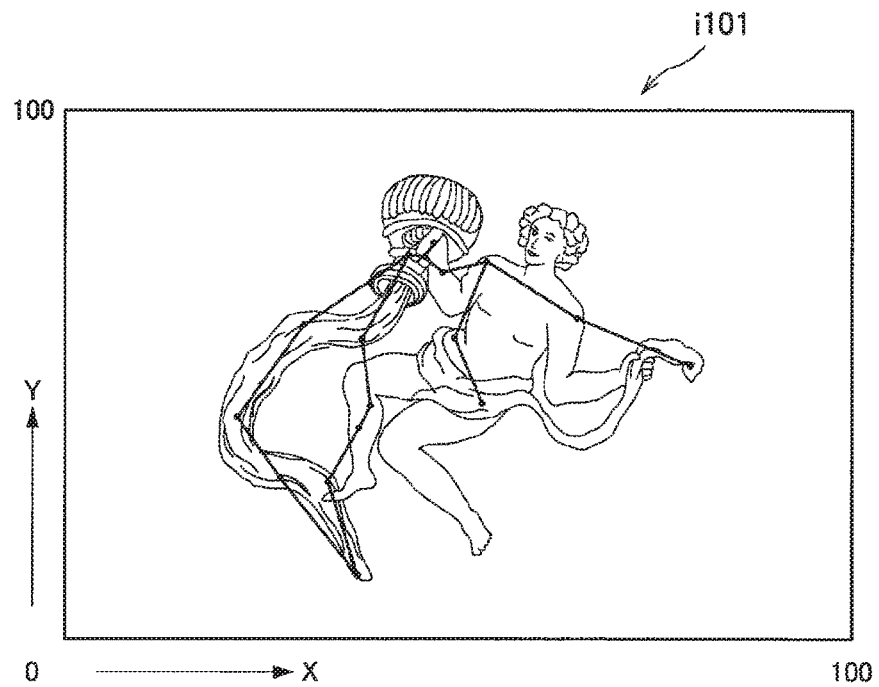
FIG. 23 is an explanatory diagram illustrating an output example of a result of an object recognition process by the information processing device 100.

The information processing device 100 may output the recognition result by applying a technology for augmented reality (AR). For example, when constellation information is used as the map information i108 and the user utters "Where is Aquarius?" while viewing the night sky, the information processing device 100 can output the language information i105 "Aquarius is here" at the time point at which the constellation is found to the head-mounted display 10 and can output an image of the constellation together in a superimposition manner to the head-mounted display 10. FIG. 23 is an explanatory diagram illustrating an output example of a result of the object recognition process by the information processing device 100. FIG. 23 illustrates a state in which the information processing device 100 outputs the image of the constellation in a superimposition manner to the head-mounted display 10 as the result of the object recognition process.

When the information processing device 100 analyzes the language information input by the user and performs the object recognition process based on the analysis result, and an object designated by the language information from the user is located in the middle of the image information i101, the information processing device 100 may notify the head-mounted display 10 that the object designated by the language information from the user is located in the middle of the image information i101, for example, may transmit an instruction to output vibration or a sound.

When the information processing device 100 may not detect a plurality of recognition objects and uniquely specify the recognition objects by performing image processing base on the language information i106 input by the user, the language information i105 is generated in a form to which features of the objects are added at the time of generation of the language information i105 by the language generation unit 130. Examples of the features include color, size, position, brightness, and distance. For example, when the language information i106 input by the user is content "What is that red thing?" for example, a plurality of different red objects such as apples and tomatoes are assumed to be present in the image information i101. At this time, for example, the information processing device 100 generates the language information i105 to which the features of the objects are added, such as "There are a plurality of red objects and the largest object is an apple."

For example, when the language information i106 input by the user is content "What is that red thing?" for example, a plurality of different red objects such as apples and tomatoes are assumed to be present in the image information i101. At this time, the information processing device 100 may generate the language information i105 to ask for a request for new information, such as "There are a plurality of red objects. Which one?" or "There are a plurality of red objects; please point to one with your finger," to the user.

The information processing device 100 generates the language information i105 including, for example, a predetermined message when the object recognition may not be performed by performing image processing based on the language information i106 input by the user. For example, the information processing device 100 may generate the language information i105 "I didn't recognize any objects," or may generate the language information i105 for describing a difference between features of the objects recognized as "I don't see any red objects, but there are oranges," and returning only the name of a found object. For example, when the objects may not be recognized, the information processing device 100 may generate the language information i105 for specifying a direction such as "Please point with your finger," and thus the information processing device 100 can perform the object recognition in a state in which the threshold value of the object recognition is lowered and a probability is low by generating the language information i105 for specifying the direction.

The information processing device 100 can perform the language analysis process and the object recognition process on the language information i106 input by the user in regard to not only a still image but also a moving image.

In the above-described example, the information processing system 1 including the head-mounted display 10 and the information processing device 100 that acquires information from the head-mounted display 10 and outputs the information to the head-mounted display 10 has been described as an example, but the present disclosure is not limited to related examples.

Figure 24:
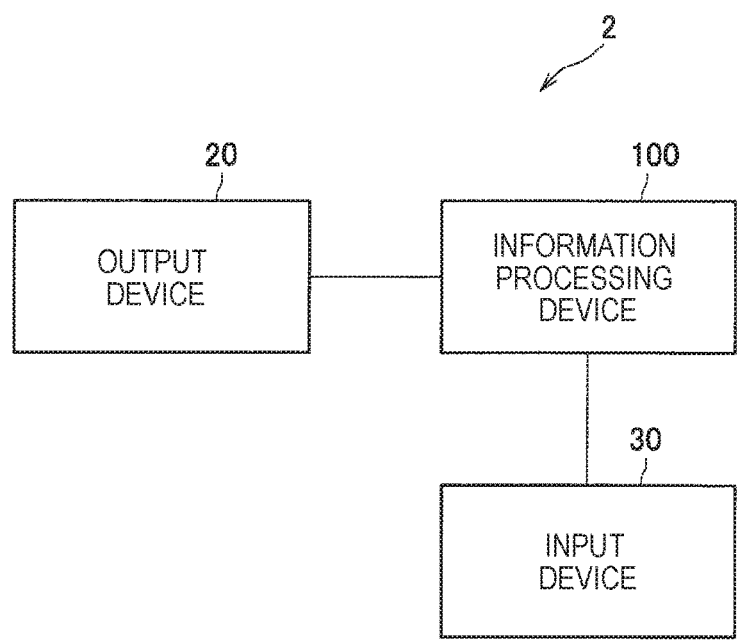
FIG. 24 is an explanatory diagram illustrating an information processing system 2 according to an embodiment of the present disclosure.

FIG. 24 is an explanatory diagram illustrating an information processing system 2 according to an embodiment of the present disclosure. The information processing system 2 illustrated in FIG. 24 is configured to include an output device 20, the information processing device 100, and an input device 30. The output device 20 is a device that outputs digital content such as moving-image data and is a device in which an output of the digital content is controlled by the information processing device 100. The input device 30 is a device that inputs language information to the information processing device 100 and is configured to include, for example, an input device such as a microphone or a keyboard.

When a user inputs language information to the information processing device 100 using the input device 30 in the information processing system 2 configured as shown in FIG. 24, the information processing device 100 can analyze the input language information and control output of the digital content to the output device 20.

For example, when the language information i106 input by the user using the input device 30 is content for designating a time, as in "What is that now?" or "Who was that wearing red clothes just now?" for example, the object recognition unit 111 of the information processing device 100 performs the object recognition process on the image information i101 which is a moving image. At this time, the information processing device 100 selects an object matching a certain standard as a recognition object among objects not included at the time point of the user's utterance in the image information i101. Examples of the standard can include an object with a largest area, an object with a largest motion, an object with largest luminance, an object with a loudest volume, and an object of which a characteristic motion or state is changed by detecting a difference between frames.

When the information processing device 100 selects the recognition object, the information processing device 100 extracts an image (frame image) at a time point at which the recognition object is included and performs the above-described image processing on the extracted image. The information processing device 100 can generate, for example, the language information i105 "That is an automobile," to answer the question "What is that now?" from the user by performing the above-described image processing on the extracted image.

The information processing device 100 can respond not to the question from the user but to the content of the language information from the user through a process on a moving image. For example, when the language information i106 input by the user is content for instructing rewinding playback such as "Go back to the scene with the person wearing the red clothes just now," for example, the object recognition unit 111 of the information processing device 100 performs the object recognition process of searching for the person wearing the red clothes in the image information i101 which is a moving image. When the rewinding playback is instructed, the information processing device 100 can convert the moving image into a still image and can repeatedly perform the above-described recognition process in sequence, and thus rewind the moving image to the scene in which the object designated by the user (the person wearing the red clothes) appears by causing the output device 20 to rewind the moving image from the time point at which the user inputs the language information to a time at which the object designated by the user is first found. Then, the information processing device 100 can cause the output device 20 to rewind the moving image to the leading portion of a scene in which the object recently appeared by further rewinding the moving image from a time at which the object designated by the user is first found to a time point at which the object designated by the user disappears from the image.

For example, when the language information i106 input by the user is content for instructing rewinding playback, such as "Go back to the scene where the person wearing the red clothes first appeared just now," for example, the object recognition unit 111 of the information processing device 100 can perform the object recognition process of searching for an image in which the person wearing the red clothes first appeared in the image information i101 which is the moving image.

The information processing device 100 can express scene information indicating which scene the image information i101 is, by a sentence obtained as the result of the recognition process on the image information i101 which is the moving image. When the scene information is generated from the image information i101 which is the moving image, for example, the object recognition unit 111 of the information processing device 100 can perform the object recognition processing using the scene information. For example, when information in which there is a scene in which A and B appear together in the image information i101 can be obtained as scene information in the result of the recognition process on the image information i101 which is the moving image, the user is assumed to input the language information i106 "Show me the scene with A and B together" to the information processing device 100. The information processing device 100 can instruct the output device 20 to output the image information i101 from the scene in which A and B appear together obtained from the scene information based on the language information i106, "Show me the scene with A and B together."

The 2-dimensional image has been described above, but the present disclosure is not limited to related examples. That is, the information processing device 100 can also perform the same process in the depth direction on the image information i101 in which the Z axis is provided. It is needless to say that the various tables or threshold values described above can be changed into any values by the user.

2. Hardware Configuration

Figure 25:
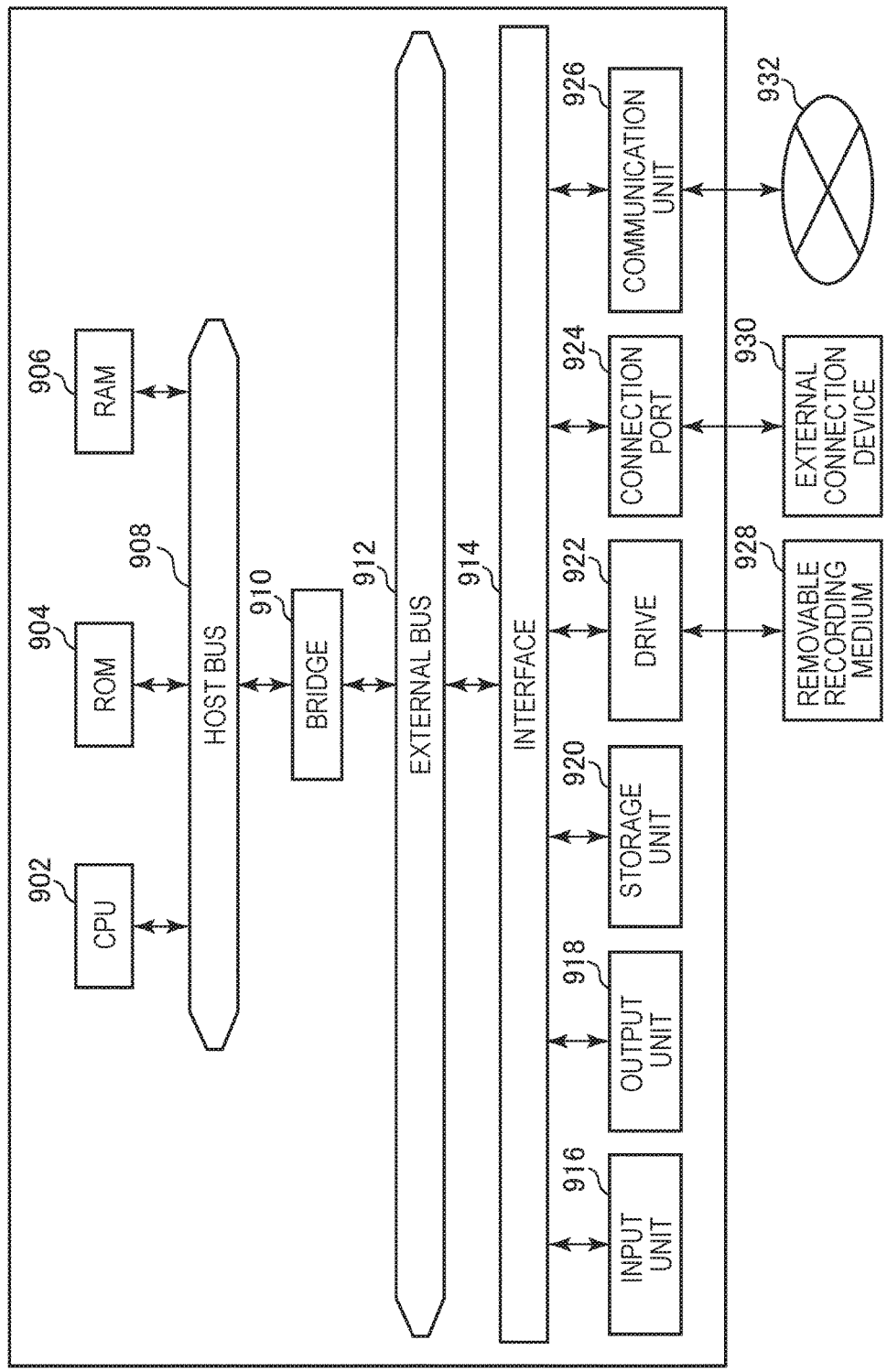
FIG. 25 is a block diagram illustrating an example of a hardware configuration of an information processing device 100 according to the embodiment of the present disclosure.

Next, a hardware configuration of the information processing device 100 according to an embodiment of the present disclosure will be described with reference to FIG. 25. FIG. 25 is a block diagram illustrating an example of a hardware configuration of the information processing device 100 according to the embodiment of the present disclosure. Each of the algorithms described above can be performed by using, for example, the hardware configuration of the information processing device shown in FIG. 25. That is, the processing of each of the algorithms can be realized by controlling the hardware shown in FIG. 25 using a computer program. Note that the mode of this hardware is arbitrary, and may be, for example, a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 25, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element based on various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

The foregoing thus illustrates an exemplary hardware configuration of the information processing device 100. Each of the above components may be realized using general-purpose members, but may also be realized in hardware specialized in the function of each component. Such a configuration may also be modified as appropriate according to the technological level at the time of the implementation.

3. Conclusion

According to the embodiment of the present disclosure described above, there is provided the information processing device 100 performing the process of deciding the process content of the image information according to the content of the language information input by the user. The information processing device 100 according to the embodiment of the present disclosure can perform the effective process on the image information by performing the process of deciding the process content of the image information according to the content of the language information input by the user.

The information processing device 100 according to the embodiment of the present disclosure can express a position in a language expression such as "bottom right of screen" or "somewhat top right from middle of screen" or express the positional relation between a target object and a goal object as in "just the right of the red automobile," "in front of the red automobile," "quite to the right of the red automobile," or "on the table" with language.

When a relative positional relation is input, the information processing device 100 according to the embodiment of the present disclosure performs the image recognition. Therefore, it is not necessary to orient a camera or a lens in the direction of a recognition target in order to recognize any object from a plurality of objects. When language information such as "What is that on the table?" or "Who is that to the right of Taro?" is input by the user, the information processing device 100 according to the embodiment of the present disclosure can appropriately analyze the content and set a recognition region.

When an inquiry "Where is the remote controller?" is input by the user, the information processing device 100 according to the embodiment of the present disclosure can perform a process of presenting a region in which an object is present with emphasis on a screen, replying by text or voice such as "It's on the desk to your right," or giving a notification by a sound or vibration when the recognition object comes in the middle of a screen, through a glasses-type wearable computer such as the head-mounted display 10.

The information processing device 100 according to the embodiment of the present disclosure can generate a reply to an inquiry such as "What is that large building seen on the right?" or "What is the name of the mountain seen to the left of the tower?" from the user or search for actual buildings or a natural topography in response to an inquiry such as "Where can I see Mt. Fuji?" from the user by using GPS information or map information. Accordingly, the information processing device 100 according to the embodiment of the present disclosure can perform a process appropriate for the inquiry of the user by using the GPS information or the map information.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The information processing device 100 according to the embodiment of the present disclosure may be realized as a device different from a device including a display that displays an image displayed as a result of a process of the information processing device 100 (for example, a server device connected to a device including a display via a network such as the Internet) or may be realized as a terminal device that receives information from a server device. The configuration of the information processing device 100 according to the embodiment of the present disclosure may be realized by a single device or a system in which a plurality of devices cooperate. The system in which the plurality of devices cooperate can include a combination of a plurality of server devices and a combination of a server device and a terminal device.

Note that software that realizes a user interface or an application shown in the above-described embodiments may be realized as a web application that is used via a network such as the Internet. Such a web application may be realized with a markup language, for example, HyperText Markup Language (HTML), Standard Generalized Markup Language (SGML), Extensible Markup Language (XML), or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
An information processing device including:
an image region specifying unit configured to specify a region in an image based on input language information; and
a process content specifying unit configured to specify content of a process using the image in regard to the region specified in the image by the image region specifying unit based on the input language information.

(2)
The information processing device according to (1),
wherein the process content specifying unit specifies that a recognition process for an object in the region specified in the image by the image region specifying unit is performed based on the input language information.

(3)
The information processing device according to (2),
wherein the image region specifying unit specifies a region in the image based on further input language information using the object recognized in the specified region in the image as a standard.

(4)
The information processing device according to any of (1) to (3),
wherein the process content specifying unit specifies that a process of acquiring information regarding an object included in the region specified in the image by the image region specifying unit is performed based on the input language information.

(5)
The information processing device according to (4),
wherein the process content specifying unit specifies that a process of acquiring a name of the object as the information regarding the object is performed.

(6)
The information processing device according to (4) or (5),
wherein the image region specifying unit specifies a region in the image based on further input language information using the object for which the information is acquired in the specified region in the image as a standard.

(7)
The information processing device according to any of (1) to (6),
wherein, when the image region specifying unit specifies the region specified in the image and subsequently language information indicating cancellation of the specifying is input, the image region specifying unit cancels the immediately previous specifying of the region in the image.

(8)
The information processing device according to any of (1) to (7),
wherein, when language information indicating limitation of a time on the image is input as the language information, the process content specifying unit limits the time of the image which is a target of a process using the image.

(9)
The information processing device according to any of (1) to (8), further including:
an object recognition unit configured to recognize an object of the image based on a process specified by the process content specifying unit.

(10)
The information processing device according to (9), further including:
a language generation unit configured to generate language information indicating a result of a process performed by the image processing unit.

(11)
The information processing device according to (10),
wherein, based on the process specified by the process content specifying unit, the language generation unit generates the language information by adding a feature of the recognized object when an object is not uniquely specifiable from the input language information as a result obtained by the object recognition unit performing the process of recognizing the object of the image.

(12)
The information processing device according to (10),
wherein, based on the process specified by the process content specifying unit, the language generation unit generates the language information according to an extent of an object recognition result based on the input language information by the object recognition unit as a result obtained by the object recognition unit performing the process of recognizing the object of the image.

(13)
The information processing device according to any of (1) to (12), further including:
a recognition region display unit configured to superimpose and display the region specified by the image region specifying unit on the image.

(14)
The information processing device according to any of (1) to (13),
wherein the image region specifying unit divides the image into a predetermined number of regions based on the input language information and specifies the region in the image using each of the divided regions.

(15)
The information processing device according to any of (1) to (14),
wherein, when the input language information includes an adverb indicating a degree, the image region specifying unit specifies the region in the image with reference to the adverb.

(16)
An information processing method including:
specifying a region in an image based on input language information; and
specifying content of a process using the image in regard to the specified region in the image based on the input language information.

(17)
A computer program causing a computer to perform:
specifying a region in an image based on input language information; and
specifying content of a process using the image in regard to the specified region in the image based on the input language information.

REFERENCE SIGNS LIST 10 head-mounted display (HMD)
100 information processing device
110 image processing unit
111 object recognition unit
112 image recognition region setting unit
113 object position information extraction unit
114 process content specifying unit
120 image position language information conversion unit
130 language generation unit
140 contour information processing unit
150 RGB color name conversion unit
160 building discrimination unit
170 language analysis unit 172 similar image retrieval unit
174 recognition region display unit
176 language image position information conversion unit
178 recognition region specifying unit
180 recognition object display unit
190 language information output unit

The invention claimed is:

1. An information processing device comprising:
an image region specifying unit configured to
    divide an image captured by a camera into a predetermined number of regions,
    specify a region, of the predetermined number of regions, in the image based on input language information,
    subdivide, based on the input language information indicating a degree, the specified region in the image into a plurality of subdivided regions,
    specify one or more subdivided regions, of the plurality of subdivided regions, in the image based on a level of the degree indicated by the input language information, and
    limit the regions in which a recognition process is performed for an object in the image based on the one or more subdivided regions specified in the image by the image region specifying unit;
a process content specifying unit configured to specify content of a process using the image in regard to only the one or more subdivided regions specified in the image by the image region specifying unit based on the input language information; and
an information output unit configured to output information regarding the object recognized in the one or more subdivided regions specified in the image by the image region specifying unit,
wherein a number of the one or more specified subdivided regions, of the plurality of subdivided regions, in the image varies based on the level of the degree,
wherein the process content specifying unit specifies that a recognition process for the object in only the one or more subdivided regions specified in the image by the image region specifying unit is performed based on the input language information, and
wherein the image region specifying unit, the process content specifying unit, and the information output unit are each implemented via at least one processor.

2. The information processing device according to claim 1,
wherein the process content specifying unit specifies that a process of acquiring the information regarding an object included in the region specified in the image by the image region specifying unit is performed based on the input language information.

3. The information processing device according to claim 2,
wherein the process content specifying unit specifies that a process of acquiring a name of the object as the information regarding the object is performed.

4. The information processing device according to claim 2,
wherein the image region specifying unit specifies a region in the image based on further input language information using the object for which the information is acquired in the specified region in the image as a standard.

5. The information processing device according to claim 1,
wherein, when the image region specifying unit specifies the region specified in the image and subsequently language information indicating cancellation of the specifying is input, the image region specifying unit cancels the immediately previous specifying of the region in the image.

6. The information processing device according to claim 1,
wherein, when language information indicating limitation of a time on the image is input as the language information, the process content specifying unit limits the time of the image which is a target of a process using the image.

7. The information processing device according to claim 1, further comprising:
an object recognition unit configured to recognize an object of the image based on a process specified by the process content specifying unit,
wherein the object recognition unit is implemented via at least one processor.

8. The information processing device according to claim 7, further comprising:
a language generation unit configured to generate language information indicating a result of the recognition by the object recognition unit,
wherein the language generation unit is implemented via at least one processor.

9. The information processing device according to claim 8,
wherein, based on the process specified by the process content specifying unit, the language generation unit generates the language information by adding a feature of the recognized object when an object is not uniquely specifiable from the input language information as a result obtained by the object recognition unit performing the process of recognizing the object of the image.

10. The information processing device according to claim 8,
wherein, based on the process specified by the process content specifying unit, the language generation unit generates the language information according to an extent of an object recognition result based on the input language information by the object recognition unit as a result obtained by the object recognition unit performing the process of recognizing the object of the image.

11. The information processing device according to claim 7, wherein, when the object recognition unit recognizes at least two objects of the image based on the process specified by the process content specifying unit, the object recognition unit decides an object, of the at least two objects, with a largest area in the region as a recognition object.

12. The information processing device according to claim 7, wherein, when the object recognition unit recognizes at least two objects of the image based on the process specified by the process content specifying unit, the object recognition unit decides an object, of the at least two objects, nearest to a center of the region as a recognition object.

13. The information processing device according to claim 1, further comprising:
a recognition region display unit configured to superimpose and display the region specified by the image region specifying unit on the image,
wherein the recognition region display unit is implemented via at least one processor.

14. The information processing device according to claim 1,
wherein the image region specifying unit divides the image into the predetermined number of regions based on the input language information and specifies the region in the image using each of the predetermined number of regions.

15. The information processing device according to claim 1,
wherein, when the input language information includes an adverb indicating the degree, the image region specifying unit specifies the region in the image with reference to the adverb.

16. The information processing device according to claim 1, wherein the image region specifying unit specifies a region in the image based on further input language information using the object recognized in the specified region in the image as a standard.

17. The information processing device according to claim 1,
wherein the image specifying unit is further configured to specify a first subdivided region, of the plurality of subdivided regions, in the image based on a level of the degree indicated by the input language information being a first level, and
specify a second subdivided region, of the plurality of subdivided regions, in the image based on a level of the degree indicated by the input language information being a second level.

18. An information processing method comprising:
dividing an image captured by a camera into a predetermined number of regions;
specifying a region, of the predetermined number of regions, in the image based on input language information;
subdividing, based on the input language information indicating a degree, the specified region in the image into a plurality of subdivided regions;
specifying one or more subdivided regions, of the plurality of subdivided regions, in the image based on a level of the degree indicated by the input language information;
limiting the regions in which an object is recognized in the image based on the one or more subdivided regions specified in the image;
specifying content of a process using the image in regard to only the one or more specified subdivided regions in the image based on the input language information;
specifying that a recognition process for the object in only the one or more specified subdivided regions is performed based on the input language information; and
outputting information regarding the object recognized in the one or more subdivided regions specified in the image,
wherein a number of the one or more specified subdivided regions, of the plurality of subdivided regions, in the image varies based on the level of the degree.

19. A non-transitory computer-readable medium having embodied thereon a program, which when executed by a computer causes the computer to execute a method, the method comprising:
dividing an image captured by a camera into a predetermined number of regions;
specifying a region, of the predetermined number of regions, in the image based on input language information;
subdividing, based on the input language information indicating a degree, the specified region in the image into a plurality of subdivided regions;
specifying one or more subdivided regions, of the plurality of subdivided regions, in the image based on a level of the degree indicated by the input language information;
limiting the regions in which an object is recognized in the image based on the one or more subdivided regions specified in the image;
specifying content of a process using the image in regard to only the one or more specified subdivided regions in the image based on the input language information;
specifying that a recognition process for the object in only the one or more specified subdivided regions is performed based on the input language information; and
outputting information regarding the object recognized in the one or more subdivided regions specified in the image,
wherein a number of the one or more specified subdivided regions, of the plurality of subdivided regions, in the image varies based on the level of the degree.

* * * * *